(12) United States Patent
Vo

(10) Patent No.: US 8,276,620 B2
(45) Date of Patent: Oct. 2, 2012

(54) FLEXIBLE PIPE FOR OFFSHORE AND OTHER APPLICATIONS

(76) Inventor: Dang The Vo, Houston, TX (US)

( * ) Notice: Subject to any disclaimer, the term of this patent is extended or adjusted under 35 U.S.C. 154(b) by 313 days.

(21) Appl. No.: 12/546,195

(22) Filed: Aug. 24, 2009

(65) Prior Publication Data

US 2009/0308478 A1    Dec. 17, 2009

Related U.S. Application Data

(63) Continuation-in-part of application No. 12/042,406, filed on Mar. 5, 2008, now Pat. No. 7,946,313.

(51) Int. Cl.
    *F16L 11/00* (2006.01)
(52) U.S. Cl. ...... 138/135; 138/134; 138/109; 285/222.2
(58) Field of Classification Search ................. 138/135, 138/134, 109; 285/222.1, 222.4
    See application file for complete search history.

(56) References Cited

U.S. PATENT DOCUMENTS

| | | | |
|---|---|---|---|
| 956,076 A | 4/1910 | Greenfield | 285/222.5 |
| 1,821,328 A | 9/1931 | Segelhorst | 285/148.19 |
| 1,847,218 A | 3/1932 | Lamb | 285/222.3 |
| 2,076,632 A | 4/1937 | Goodall | 285/55 |
| 2,234,350 A | 3/1941 | Muller | 285/222.3 |
| 2,394,632 A | 2/1946 | Parker | 285/222.1 |
| 2,610,869 A | 9/1952 | Raymond | 285/222.5 |
| 2,940,778 A | 6/1960 | Kaiser | 285/95 |
| 3,112,937 A | 12/1963 | Williams | 285/114 |
| 3,140,106 A | 7/1964 | Thomas | 285/222.4 |
| 3,148,898 A | 9/1964 | Somers | 285/222.1 |
| 3,217,282 A | 11/1965 | Chevalier et al. | 439/452 |
| 3,596,933 A * | 8/1971 | Luckenbill | 285/94 |
| 3,684,319 A * | 8/1972 | Samartina | 285/247 |
| 3,874,064 A | 4/1975 | Chevalier | 29/460 |
| 3,936,118 A | 2/1976 | Thiery et al. | 439/191 |
| 4,033,612 A | 7/1977 | Chevalier | 285/222.4 |
| 4,549,581 A * | 10/1985 | Unno et al. | 138/109 |
| 4,567,916 A | 2/1986 | Antal et al. | 138/104 |
| 4,679,826 A | 7/1987 | Olsen | 285/222.1 |
| 4,773,452 A | 9/1988 | Dotti et al. | 138/109 |
| 4,895,185 A | 1/1990 | Champleboux et al. | 138/109 |

(Continued)

OTHER PUBLICATIONS

DeepFlex, Inc.; Product Information Sheet—"Non-Metallic Flexible Pipe: Advantages of DeepFlex Composite Pipe;" Retrieved at http://www.deepflex.com/products-advantages.html on Dec. 20, 2007; 1 page.

(Continued)

*Primary Examiner* — Patrick F Brinson
(74) *Attorney, Agent, or Firm* — Wong, Cabello, Lutsch, Rutherford & Brucculeri, LLP

(57) ABSTRACT

A flexible pipe for conducting fluid, such as offshore production fluids, has interior tubing, a series of rings and clamps, and exterior tubing. The interior tubing has an extruded tube and a surrounding layer. Outer rings dispose about the interior tubing and abut end-to-end. Inner rings dispose on the tubing and fit in between each of the outer rings. These inner rings have tapered surfaces that fit against beveled ends defined in each end of the outer ring's internal bore. The clamps affix the abutting ends of the outer rings together, and the exterior tubing disposes on the series of rings and clamps. This exterior tubing has an inner layer of wrapped tape surrounded by an extruded tube. A flange couples by an end clamp to the end ring of the pipe, and inner and outer supports on the flange support the interior and exterior tubing.

55 Claims, 15 Drawing Sheets

U.S. PATENT DOCUMENTS

| | | | | |
|---|---|---|---|---|
| 4,950,001 | A | | 8/1990 | Briggs .................. 285/222.1 |
| 5,259,418 | A | * | 11/1993 | Hamrick .................. 138/104 |
| 5,639,128 | A | | 6/1997 | Belcher .................. 285/222.1 |
| 5,860,682 | A | | 1/1999 | Belcher .................. 285/222.1 |
| 6,039,083 | A | | 3/2000 | Loper .................. 138/135 |
| 6,065,501 | A | * | 5/2000 | Feret et al. .................. 138/134 |
| 6,192,941 | B1 | * | 2/2001 | Mallen-Herrero et al. ... 138/135 |
| 6,253,793 | B1 | * | 7/2001 | Dupoiron et al. .......... 138/135 |
| 6,273,142 | B1 | | 8/2001 | Braad .................. 138/109 |
| 6,315,002 | B1 | | 11/2001 | Antal et al. .................. 138/109 |
| 6,354,333 | B1 | * | 3/2002 | Dupoiron et al. .......... 138/135 |
| 6,360,781 | B1 | | 3/2002 | Braad .................. 138/109 |
| 6,382,681 | B1 | | 5/2002 | Berton et al. ............ 285/222.1 |
| 6,491,779 | B1 | | 12/2002 | Bryant .................. 156/192 |
| 6,592,153 | B1 | | 7/2003 | Belcher .................. 285/222.2 |
| 6,739,355 | B2 | * | 5/2004 | Glejbøl et al. ............ 138/135 |
| 6,889,717 | B2 | * | 5/2005 | Coutarel et al. .......... 138/135 |
| 6,889,718 | B2 | * | 5/2005 | Glejbøl et al. ............ 138/135 |
| 6,923,477 | B2 | | 8/2005 | Buon et al. .............. 285/222.1 |
| 7,073,978 | B2 | | 7/2006 | Bryant .................. 405/172 |
| 7,175,208 | B2 | | 2/2007 | Belcher .................. 285/249 |
| 7,254,933 | B2 | | 8/2007 | Bryant .................. 57/232 |

OTHER PUBLICATIONS

DeepFlex, Inc.; Product Information Sheet—"Corrosion Resistant: Basic Pipe Construction;" Retrieved at http://www.deepflex.com/products-construction.html on Dec. 20, 2007; 2 pages.

DeepFlex, Inc.; Product Information Sheet—"Non-Metallic Flexible Pipe: the Next Generation of Un-bonded Pipe;" Retrieved at http://www.deepflex.com/products-range.html on Dec. 20, 2007; 1 page.

American Petroleum Institute, "Recommended Practice for Flexible Pipe," API Recommended Practice 17B, Third Edition, Mar. 2002, 166 pages.

Alex Chin, "Development of a Risk-Based Inspection and Monitoring Program for Subsea Flexible Flowlines, Case Study: Wanaea and Cossack Fields," Final Year Thesis Project, Centre for Oil/Gas Engineering, The University of Western Australia, 2002, 164 pages.

* cited by examiner

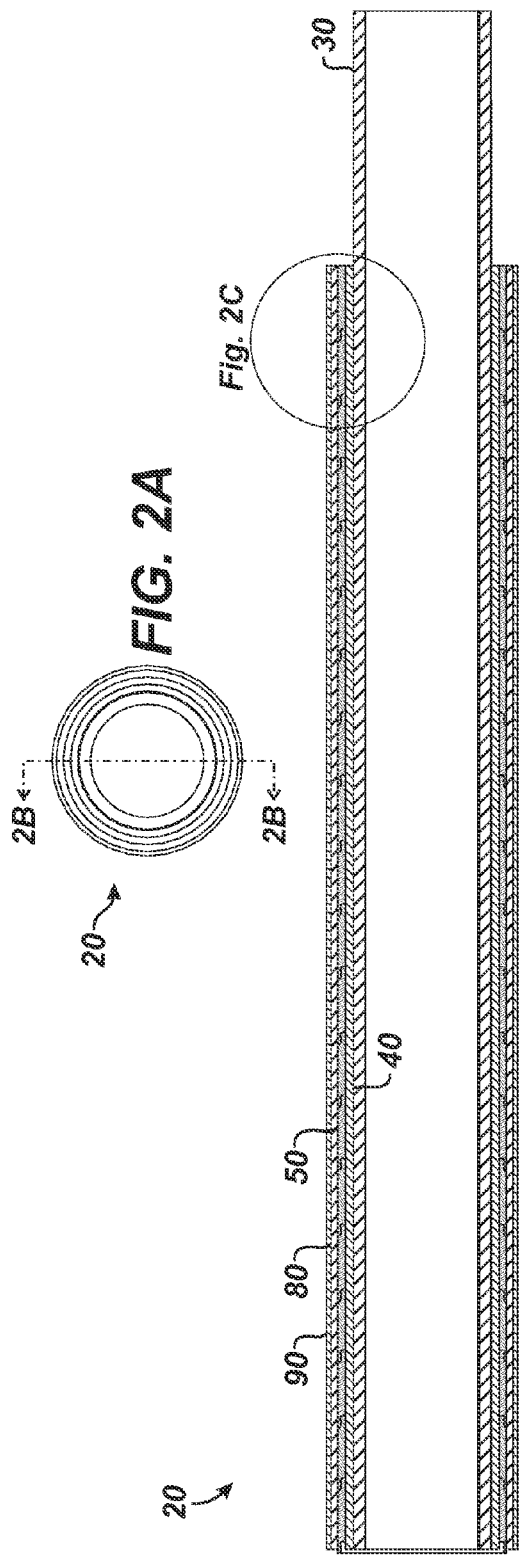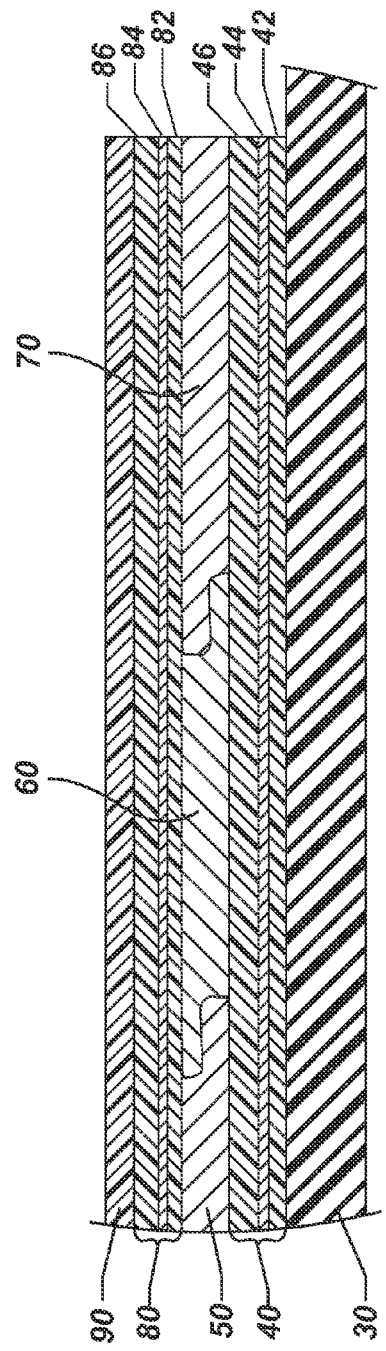

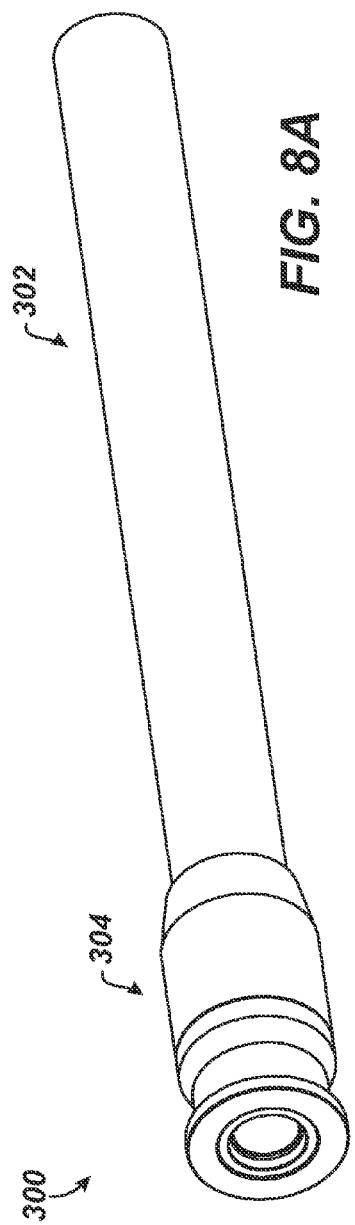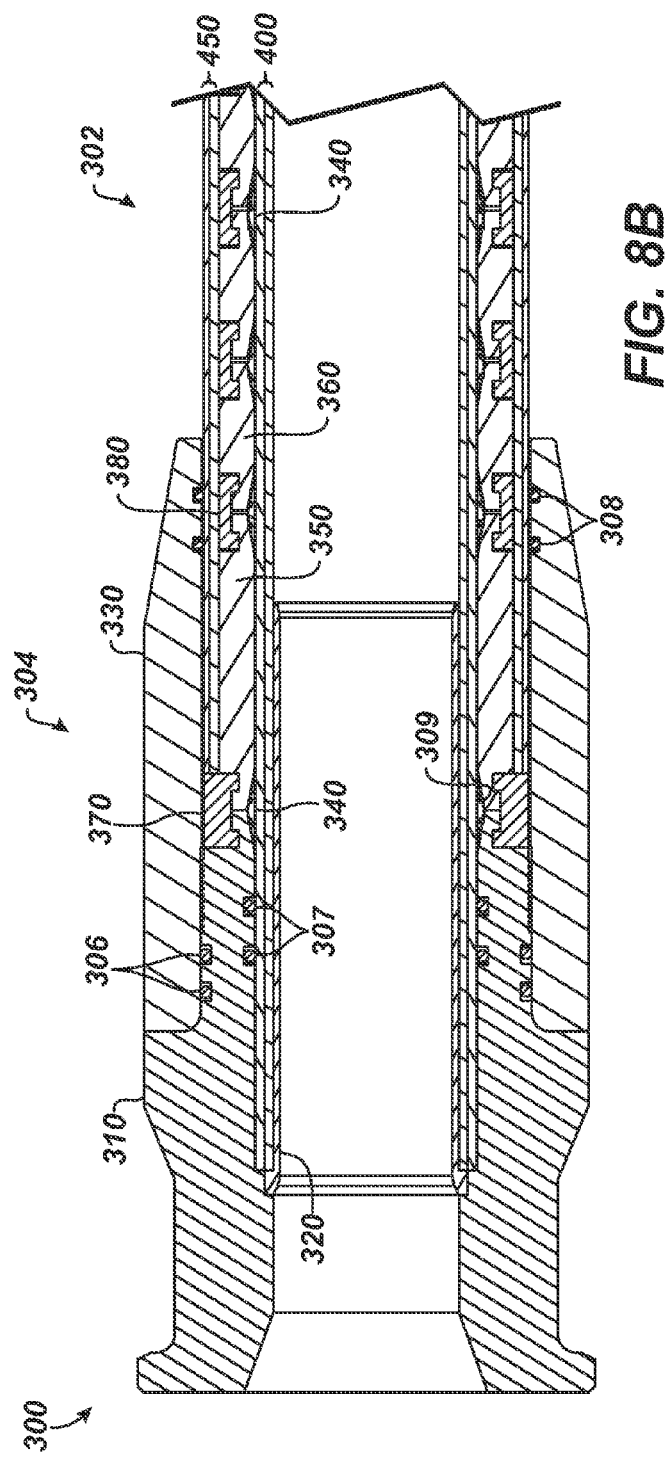

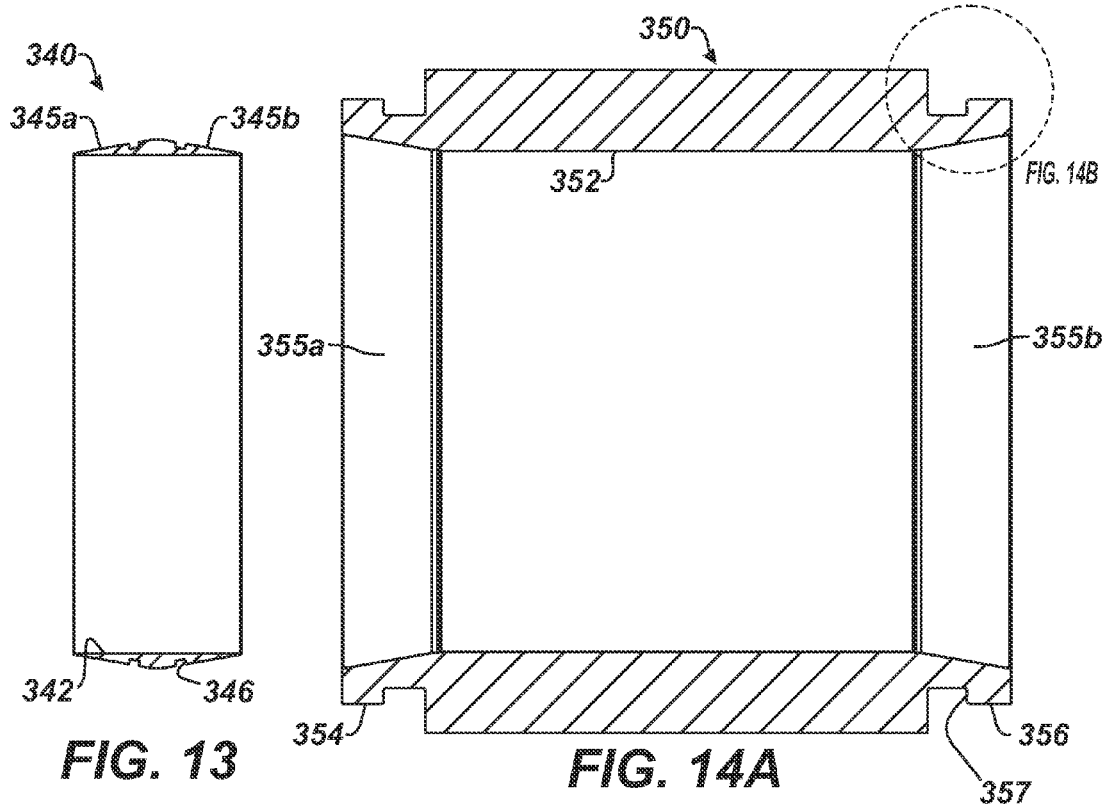
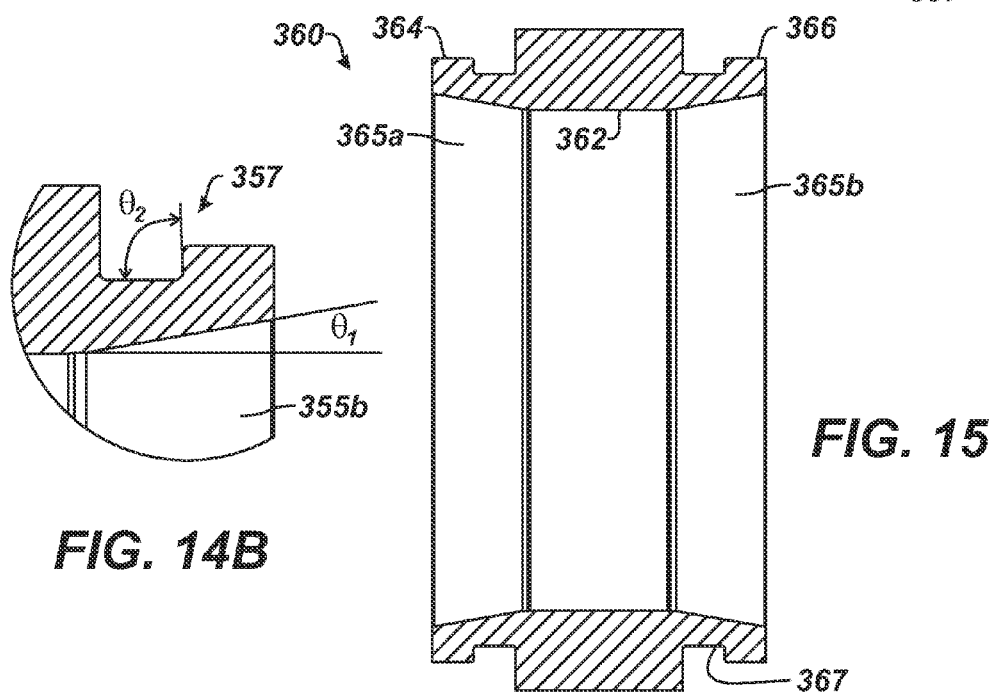
FIG. 13
FIG. 14A
FIG. 14B
FIG. 15

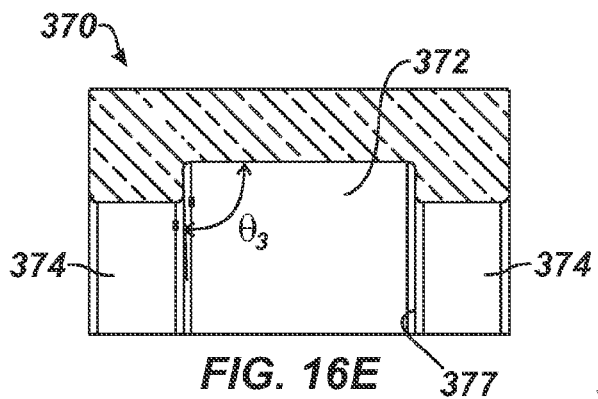
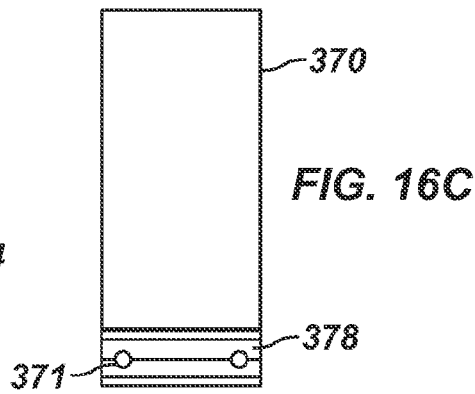
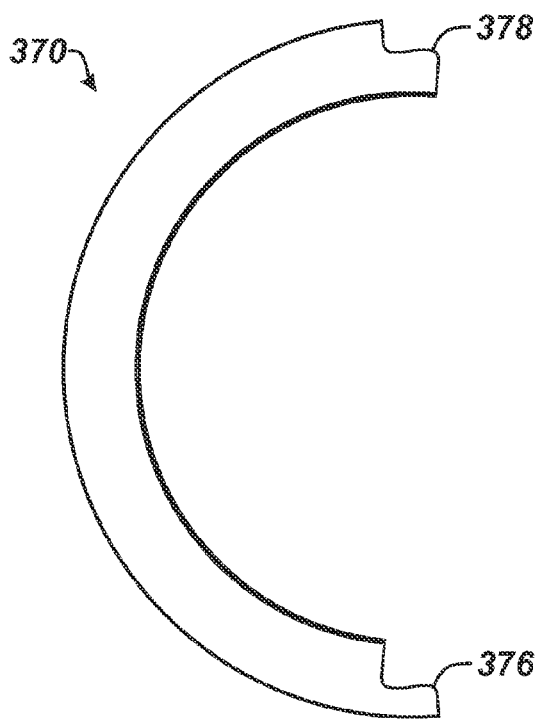
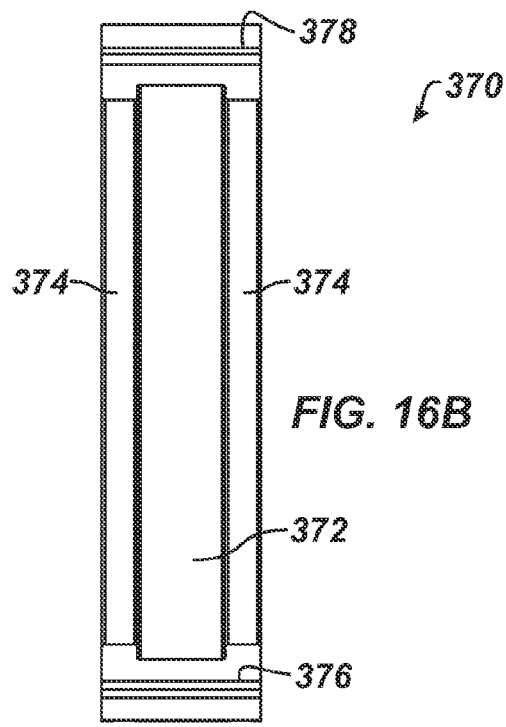
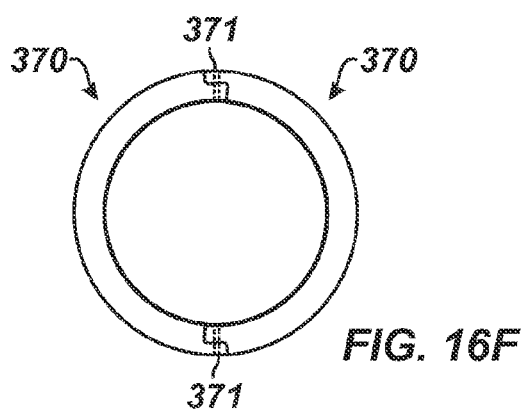
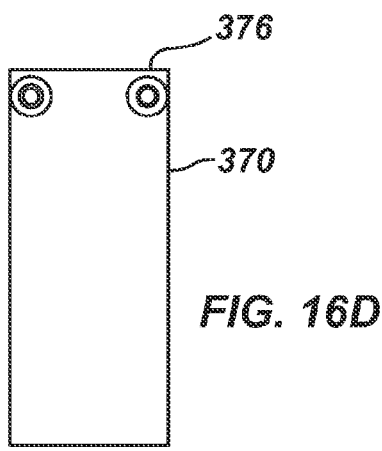

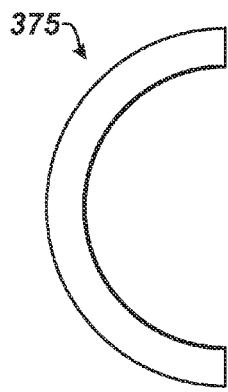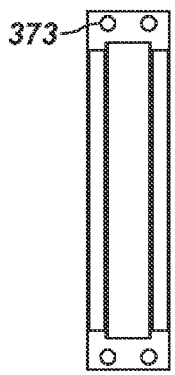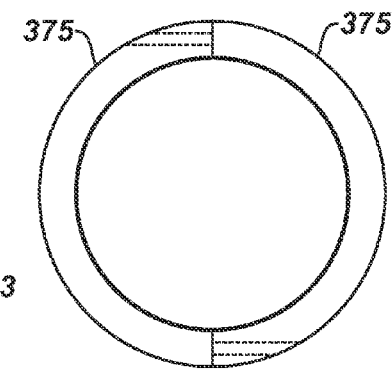
FIG. 18A  FIG. 18B  FIG. 18C  FIG. 18D
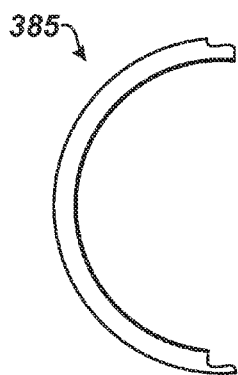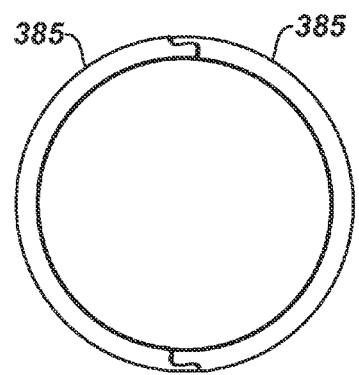
FIG. 19A  FIG. 19B  FIG. 19C
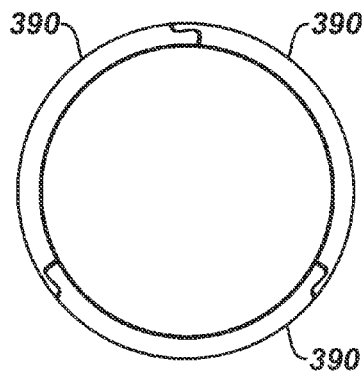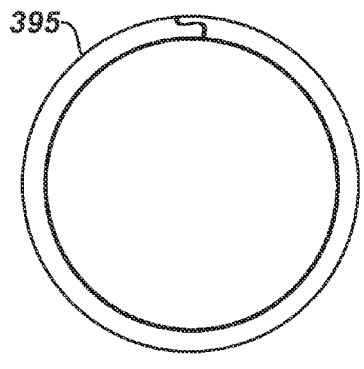
FIG. 20A  FIG. 20B

FLEXIBLE PIPE FOR OFFSHORE AND OTHER APPLICATIONS

CROSS-REFERENCE TO RELATED APPLICATIONS

This is a continuation-in-part of U.S. application Ser. No. 12/042,406, filed 5 Mar. 2008, to which priority is claimed and which is incorporated herein by reference in its entirety.

BACKGROUND

Flexible pipe can be used for fluid transport in various areas, such as conducting production fluids offshore. For example, FIGS. 1A-1B show a flexible pipe 10 similar to that designed by Deepflex, Inc. of Houston, Tex. and disclosed in U.S. Pat. Nos. 6,491,779 and 7,254,933. The pipe 10 can be used in deep sea operations such as disclosed in U.S. Pat. No. 7,073,978. In general, the pipe 10 can have internal diameters of 2, 4, 6, 8, or even up to 16-inches. From inside to outside, the flexible pipe 10 has a number of layers, including a liner layer 11, pressure reinforcement layers 12, hoop reinforcement layers 13, a membrane 14, tensile reinforcement layers 15, and an external jacket 16.

The liner layer 11 is composed of extruded thermoplastic, such as HDPE, PA-11, PVDF and XLPE, and the membrane 14 is made of extruded thermoplastic to seal against compressive loads from external seawater pressure. On the outside, the external jacket 16 is made of extruded thermoplastic to provide external protection to the pipe 10.

Internally, wraps helically wound about the pipe 10 form each of the reinforcement layers 12, 13, and 15. These wraps are made of composite material bonded and stacked together to form composite tapes. As their names imply, the pressure layers 13 are wound for external pressure loads, and the tensile layers 15 are wound for tensile loads. Likewise, the hoop layers 13 are wound for compressive loads.

Because flexible pipes can be used in conditions having high internal and/or external pressures, any rupture in one of the layers such as the pipe's inner layer can allow pressurized fluid to leak through to other surrounding layers. If those surrounding layers have gaps in them such as formed by wrapped tapes, then nothing essentially keeps the pressurized leak from reaching even more layers of the pipe.

SUMMARY

A flexible pipe is used to conduct fluids, such as production fluids in offshore applications. The flexible pipe has interior tubing, a series of rings and clamps, and exterior tubing. The interior tubing defines a bore therethrough for conducting the production fluid. The interior tubing can have an extruded tube with the bore for conducing fluid and can have an outer layer surrounding the extruded tube. The exterior tubing can have an extruded tube disposed about the rings and clamps and can have an inner layer of wrapped or woven material disposed between the extruded tube and the rings and clamps.

The rings and clamps can be composed of metal. The rings include a series of inner and outer rings alternatingly disposed on the interior tubing. For example, the outer rings dispose about the interior tubing and abut end-to-end. The inner rings dispose on the tubing and fit between each of the outer rings. These inner rings have tapered surfaces that fit against beveled ends defined in each end of the outer ring's internal bore. As an alternative to metal inner rings, bands, wrappings, or the like composed of a thermoplastic or other material can fit between beveled ends of the outer rings.

The clamps affix the abutting ends of the outer rings together, and the exterior tubing disposes on the series of rings and clamps. Each of the clamp portions has a first end with an interior facing notch and a second end with an exterior facing notch. When fit together, the first ends mate with the second ends, and fasteners can be used to couple the fit ends together. In use, the rings and clamps permit tilting between interconnected ones of the rings so the pipe can be bent and flex in the offshore environment.

A flange couples by an end clamp to the end ring of the pipe, and inner and outer supports on the flange support the interior and exterior tubing. The inner support disposes inside the interior tubing and has one end engaging inside a bore of the flange. The outer support disposes outside the exterior tubing and has one end coupled to the flange.

BRIEF DESCRIPTION OF THE DRAWINGS

FIG. 2A illustrates an end view of a flexible pipe according to the present disclosure.

FIG. 2B illustrates a cross-sectional view of the flexible pipe of FIG. 2A showing the various layers.

FIG. 2C illustrates an isolated portion of the flexible pipe's cross-section showing details of the various layers.

FIG. 8A illustrates a perspective view of another flexible pipe according to certain teachings of the present disclosure.

FIG. 8B is a cross-sectional view of the flexible pipe in FIG. 8A.

FIG. 13 illustrates a cross-section of an inner ring for the flexible pipe.

FIGS. 14A-14B illustrate a cross-section and a detailed view of an end ring for the flexible pipe.

FIG. 15 illustrates a cross-section of an intermediate ring for the flexible pipe.

FIGS. 16A-16F illustrate side, front, top, bottom, and detailed views of an end clamp for the flexible pipe.

FIGS. 18A-18D illustrate side, front, and top views of another clamp for the flexible pipe.

FIGS. 19A-19C illustrate side and front views of another clamp for the flexible pipe.

FIG. 20A illustrates a side view of three clamps for affixing rings together.

FIG. 20B illustrates a side view of a solitary clamp for affixing rings together.

DETAILED DESCRIPTION

Figure 1A:
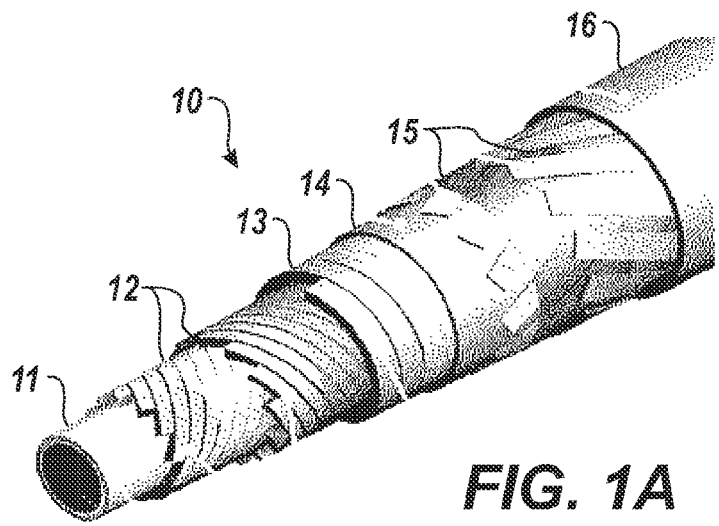
FIG. 1A illustrates a perspective view of a flexible pipe according to the prior art showing the various layers.
Figure 1B:
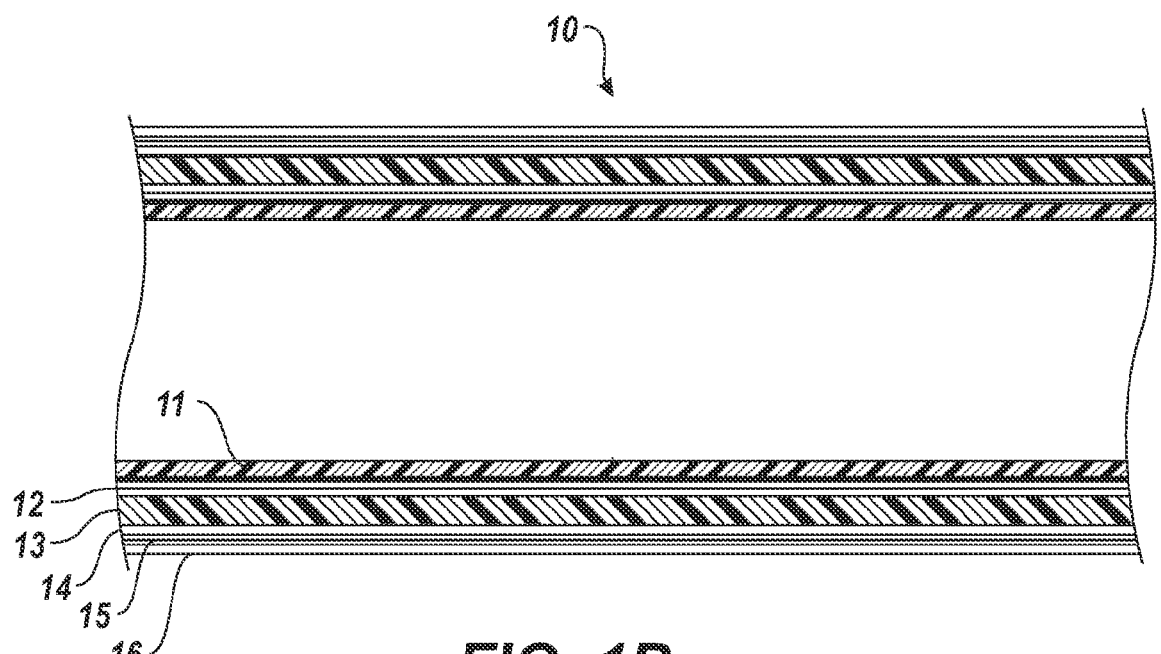
FIG. 1B illustrates a cross-sectional view of the flexible pipe of FIG. 1A.

A. Flexible Pipe Having Internal Layer, Interlocking Rings, and External Layer

A flexible pipe 20 shown in FIGS. 2A-2C can be used to convey fluids, such as production fluids in offshore application, although the flexible pipe 20 can be used in other application. The flexible pipe 20 has a plurality of layers, including from inside to outside: a liner layer 30, a first tensile layer 40, a ringed layer 50, a second tensile layer 80, and an external jacket 90. The liner layer 30 is an extruded tube made of a plastic material, such as composite thermoplastic or the like. Choice of the particular material depends on the intended use of the pipe 20. In one example, the liner layer 30 is composed of extruded nylon and Fortron® polyphenylene sulfide (PPS) (a high performance thermoplastic).

The ringed layer 50 is composed of a plurality of interlocking rings 60/70 discussed in more detail later. The external jacket 90 is composed of a hard plastic material for protection. For example, the jacket 90 can be composed of a nylon material, such as Ultramid® polyamide (nylon) from BASF Corporation for resistance to abrasion, corrosion, and high temperature (ULTRAMID is a registered trademark of BASF Aktiengesellschaft Corporation of Germany), although other materials can be used.

As their names imply, the tensile layers 40 and 80 provide tensile strength to the flexible pipe 20 as well as strength against internal/external pressure loads. Both tensile layers 40 and 80 are preferably strong enough to carry longitudinal (tensile) stresses up to 25-kpsi along the axis of the pipe 20. In the present arrangement and as best shown in FIG. 2C, each of the tensile layers 40/80 can be composed of several layers, including an extruded tube 42/82, a reinforcement layer 44/84, and a surrounding hard shell 46/86. Although two tensile layers 40/80 are shown in the present arrangement, other arrangements may have only one tensile layer either inside or outside the ringed layer 50. In addition, although the tensile layers 40/80 are shown having three layers, other arrangements may have more or less layers.

In the current arrangement, the extruded tubes 42/82 can be composed of a hard plastic material, such as a similar thermoplastic to the liner layer 30. The reinforcement layers 44/84 have fiber or wire woven or wrapped on the extruded tubes 42/82 to provide tensile strength to the pipe 20. These layers 44/84 can be composed of a heat-resistant and strong synthetic fiber, such as an aromatic polyamide ("aramid") (one type of which is Kevlar®), or can be composed of metal wire. (KEVLAR is a registered trademark of E. I. du Pont de Nemours and Company. The surrounding shells 46/86 can be a hard plastic material extruded around the reinforcement layer 44/84.

As best shown in FIG. 2C, the ringed layer 50 is comprised of a series of interconnecting rings, including central rings 60 and an end ring 70 as shown. Each of the central rings 60 interlock end to end to one another in an interlocking arrangement that still allows for bending or tilting between the rings 60 when the pipe 20 is flexed or bent. The end ring 70 interlocks at one end to a central ring 60 and has a terminated end that does not interlock with another ring.

The rings 60/70 can be composed of metal or composite material. For example, each of the rings 60/70 can be cast of 17-4 stainless steel with electroless nickel/fluoropolymer coating (e.g., Xylan®—a registered trademark of Whitford Corporation of West Chester, Pa.) for rust prevention. Alternatively, the rings 60/70 can be composed of a composite material, such as carbon-fiber or glass reinforced plastic, fiber thermoplastic, or thermoplastic formulated with metal powder, although other materials are also possible depending on the desired use of the flexible pipe 20. Due to the reinforced strength of these rings 60/70, the flexible pipe 20 can preferably withstand inside and outside pressures better than a flexible pipe composed entirely of extruded or wrapped layers, yet still provide the flexibility needed for the pipe 20 to be used in various applications, such as deep sea oil production.

Assembly of the pipe 20 is as follows. The liner layer 30's extruded plastic tube is formed with the desired internal bore diameter and wall thickness for the particular implementation. In one arrangement, the first tensile layer 40 is independently formed as a unit having its three layers 42/44/46 and having a suitable internal bore diameter and wall thickness and is fit over the liner layer 30. In another arrangement, the extruded tube 42 of the first tensile layer 40 is independently formed and fit onto the liner layer 30 or is extruded directly onto the liner layer 30, then the woven layer 44 is formed onto the outside of this extruded tube 42, and finally the outer shell 46 is extruded over the entire assembly.

With the first tensile layer 40 completed, the various rings 60/70 are positioned over the first tensile layer 40 in interlocking arrangement. Naturally, the first tensile layer 40's outer diameter and the ring 60/70's internal diameters are configured to fit together. The rings 60/70 may be wrapped with tape or the like to hold them together during assembly. Next, the second tensile layer 80 having its three layers 82/84/86 and having a suitable internal bore diameter and wall thickness is positioned or formed over the rings 60/70. As before, the second tensile layer 80 can be independently formed as a unit and fit over the rings 60/70, or the separate layers 82/84/86 can be separately positioned or formed on the assembly. Finally, the external jacket 90 is extruded on the outside of the entire assembly to complete the pipe 20.

Figure 3A:
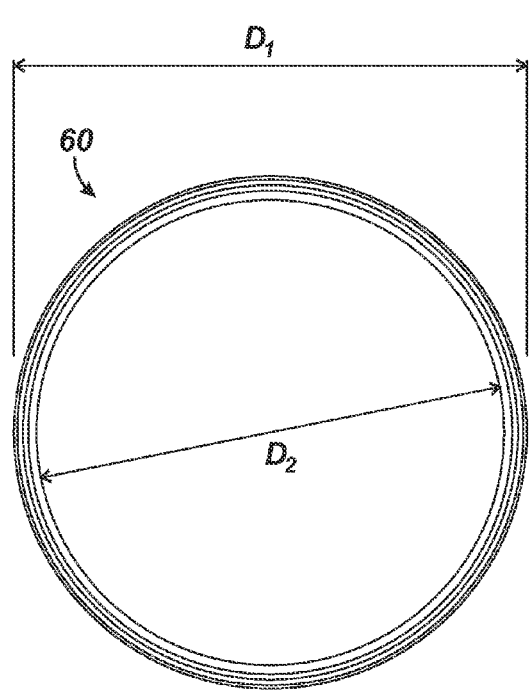
FIGS. 3A, 3B, and 3C illustrate an end view, a cross-sectional view, and a detailed view of a central ring for the flexible pipe's ringed layer.
Figure 3B:
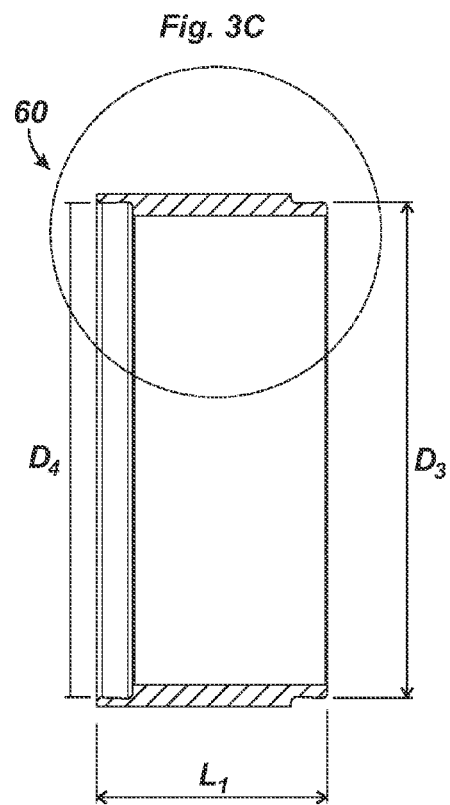
Figure 3C:
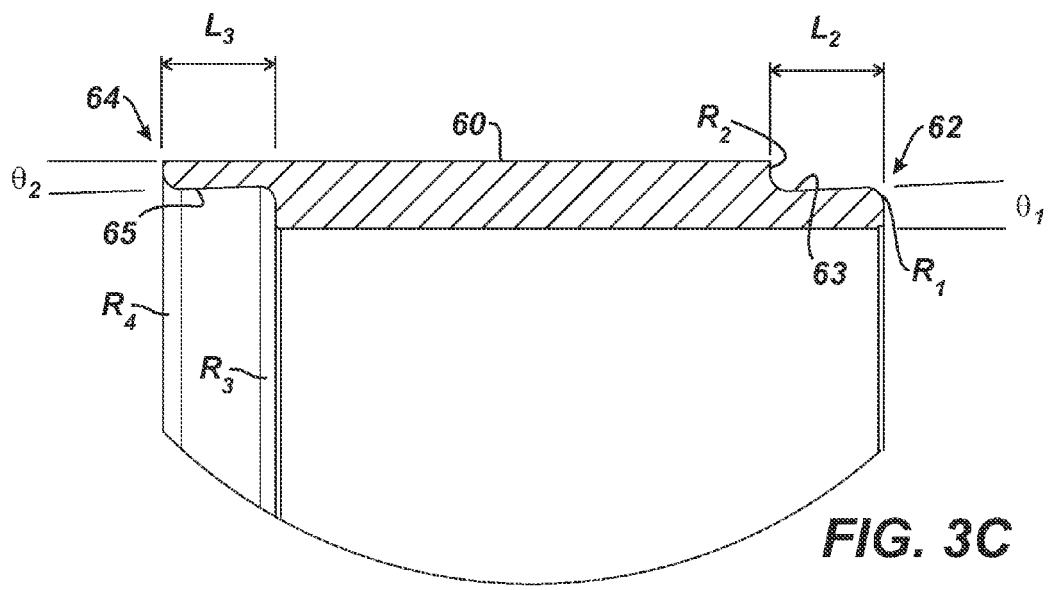

As discussed above, the ringed layer 50 has several interconnecting central rings 60—an example of which is shown in more detail in FIGS. 3A-3C. The central ring 60 has an external diameter $D_1$, an internal diameter $D_2$, and a length $L_1$. For a flexible pipe 20 with an internal bore of about 6-inches, the ring 60's external diameter $D_1$ can be about 8.885-inches, the internal diameter $D_2$ can be about 8.135-inches, and the length $L_1$ can be about 4.000-inches. Because these and other values disclosed herein pertain to a flexible pipe 20 with about a 6-inch internal diameter, it is understood that the various values for the pipe's components will differ for different diameter pipes and for particular implementations.

One end of the ring 60 has a circumferential lip 62, while the other end has a circumferential slot 64. When rings 60 couple end to end, the circumferential lip 62 interconnects with a circumferential slot 64 on an adjacent central ring 60. In the exemplary dimensions, the lip 62 defines an overall diameter $D_3$ of about 8.595-inches, and the slot 64 defines an overall inner diameter $D_4$ of about 8.575-inches.

Because the rings 60 fit together and are intended to tilt relative to one another, the circumferential lip 62 defines an outer profile 63 as shown in FIG. 3C for fitting and moving against a complementary inner profile 65 of the circumferential slot 64. The outer profile 63 extends a length $L_2$ of about 0.630-inches, while the inner profile 65 extends a length $L_3$ of about 0.625-inches. In addition, the lip 62 defines an angular slant $\theta_1$ outward of about 2.65-degrees, while the slot 64 defines an angular $\theta_2$ slant inward of about 1.94-degrees. Furthermore, the lip 62's outer edge defines a radius $R_1$ of 0.096-inches, and its inner edge defines a radius $R_2$ of about 0.096-inches. Likewise, the slots 64's inner edge defines radius $R_3$ of 0.091-inches, and its outer edge defines radius $R_4$ of 0.096-inches.

Figure 4A:
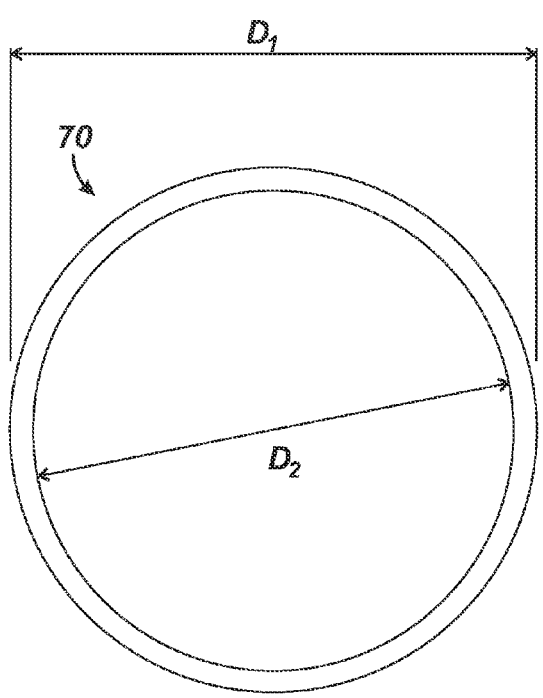
FIGS. 4A, 4B, and 4C illustrate an end view, a cross-sectional view, and a detailed view of an end ring for the flexible pipe's ringed layer.
Figure 4B:
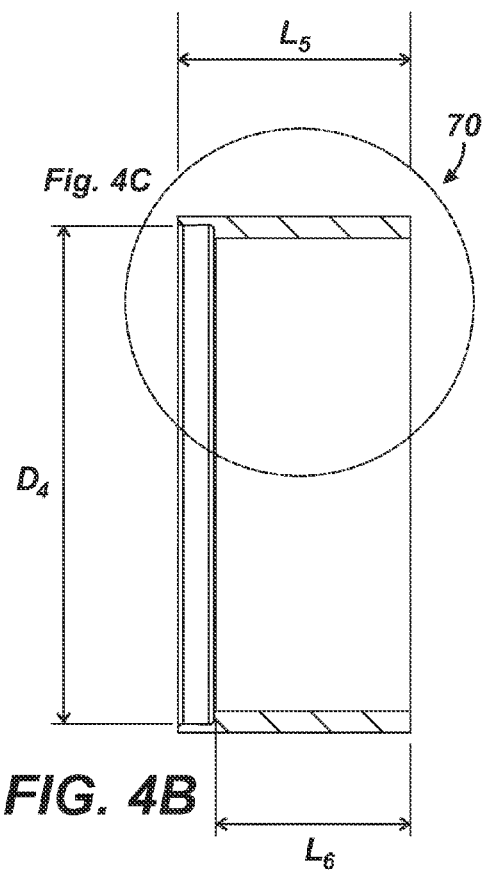
Figure 4C:
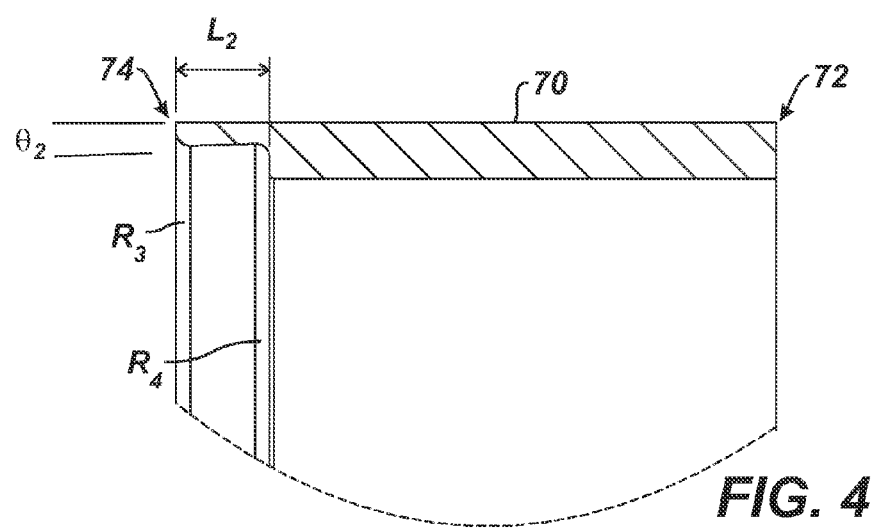

As shown in FIGS. 4A-4C, the end ring 70 is very similar to the central ring 60 discussed above. For example, the end ring's circumferential slot 74 is essentially identical to the central ring 60's slot 64 of FIGS. 3A-3C having dimensions $L_2$, $R_3$, $R_4$, and $\theta_2$ so it can interconnect with a central ring's circumferential lip 62. The ring's other end 72, however, is terminated and has no slot or lip. Although not shown, an opposite end ring for the flexible pipe can similarly be made for fitting on an opposing slot 64 of a central ring 60 of FIGS. 3A-3C and can have a terminated end and a lipped end with dimensions $L_1$, $R_2$, $R_3$, and $\theta_1$.

Figure 5:
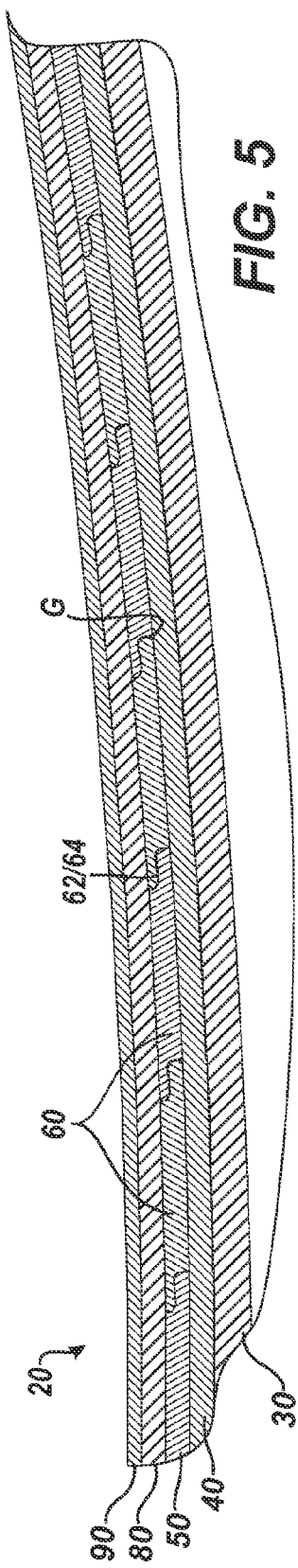
FIG. 5 shows the wall of the flexible pipe as bent.

The rings 60/70 with the associated dimensions discussed above enable the interconnected rings 60/70 to be bent or tilted relative to one another by about 1.5 degrees for every 4-inches (i.e., about 1.5-degrees for every length of ring in the flexible pipe 20). For example, FIG. 5 shows a wall of the flexible pipe 20 as bent with each of the central rings 60 tilted at about 1.5-degrees relative to one another. Preferably, gaps G that may occur between the rings 60 where they interconnect are minimal, and sharp edges on the rings 60 are avoided. The other layers 30/40/80/90 being composed of materials such as plastic, fiberglass, composites, etc., readily flex with the bending of the pipe 20.

Figure 6:
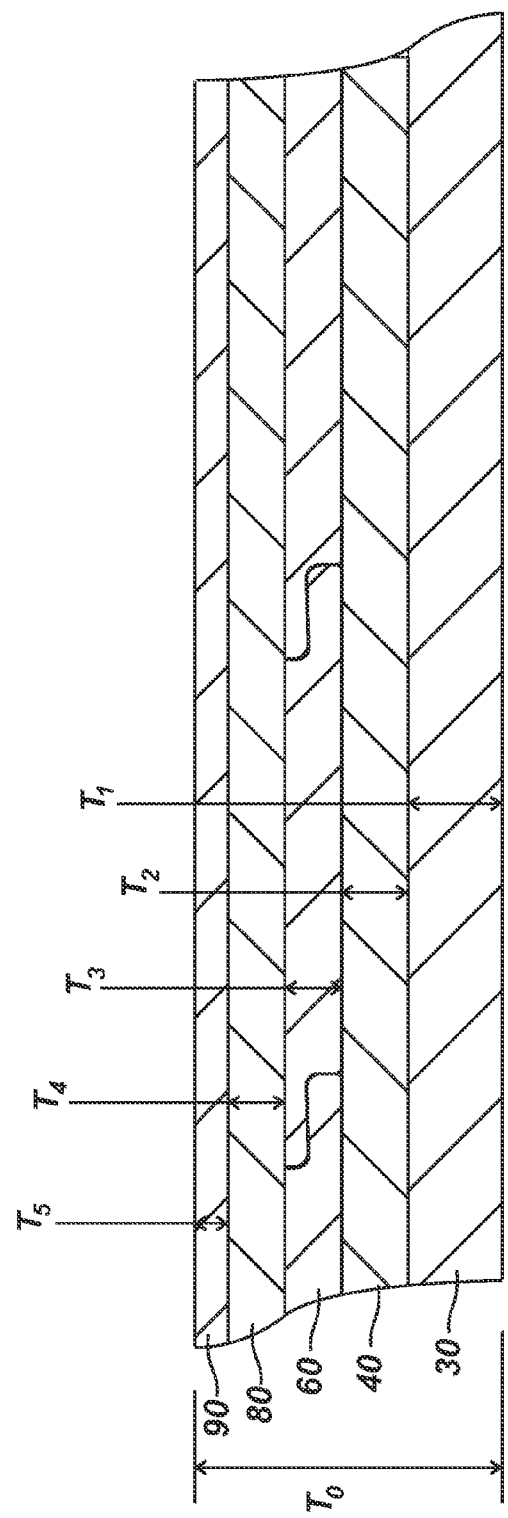
FIG. 6 shows example thicknesses of the flexible pipe's layers.

Various dimensions for the pipe's layers 30/40/50/80/90 have been provided above for illustrative purposes. As shown in FIG. 6 and in the table below, the layers 30/40/50/80/90 in general have wall thicknesses that make up the following example percentages of a flexible pipe's overall wall thickness in which the pipe has about a 6-inch internal bore:

TABLE

Each Layer's Percentage of Overall Pipe Wall Thickness

| Layer | Wall Thickness (inches) | Percentage of Overall Pipe Wall Thickness |
| --- | --- | --- |
| 30- Inner Layer | $T_1 = 1.3$ | 31% |
| 40 - First Tensile layer | $T_2 = 0.95$ | 22% |
| 50 - Ring Layer | $T_3 = 0.75$ | 18% |
| 80 - Second Tensile layer | $T_4 = 0.75$ | 18% |
| 90 - External Jacket | $T_5 = 0.46$ | 11% |
| All Layers | $T_0 = 4.0$ | 100% |

The above dimensions are provided merely for illustrative purposes. It will be appreciated that the various thickness of the layers will depend on the needs of a particular implementation, including, for example, pressure levels, tensile strength, length of the pipe, intended use of the pipe, materials selected, etc.

Figure 7:
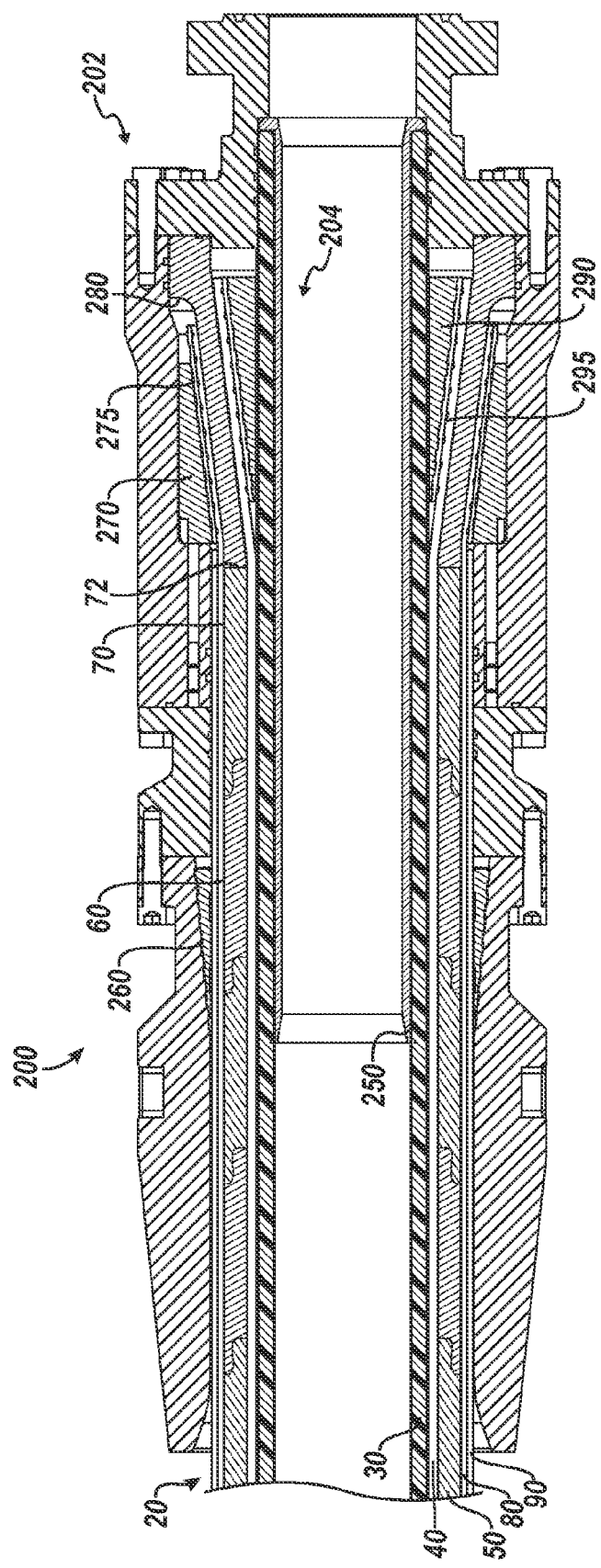
FIG. 7 shows an end of the flexible pipe connected to an end connector.

The flexible pipe 20 can be used with end connectors such as disclosed in co-pending U.S. application Ser. No. 11/961,709 entitled "End Connector for Flexible Pipe," which is incorporated herein by reference in its entirety. FIG. 7 shows an end of the flexible pipe 20 connected to one such end connector 200 of the incorporated application. As shown, the end connector 200 has an outer housing 202 and inner components 204, both of which are essentially the same as those disclosed in the incorporated application. As part of the inner components 204, locks comprising nuts and sleeves (270/275 and 290/295) mechanically grip the pipe 20's tensile layers 40/80 against an insert 280. In addition, the insert 280's end fits against the terminated end 72 of the end ring 70.

The flexible pipe 20's other layers 30/90 are handled in similar ways to like layers described in the incorporated application. For example, a tubular insert 250 fits within the inner surface of the liner layer 30, which also has an inner nut 290 positioned against part of its outer surface. Elsewhere along the pipe 20, another lock 260 threads into a portion of the connector 200's outer housing 202 and grips against the pipe's external jacket 90.

As disclosed above, the pipe 20 of FIGS. 2A-2C has five layers 30/40/50/80/90. However, variations of the disclosed flexible pipe 20 are possible. For example, the flexible pipe 20 can be composed of more or less layers depending on the implementation. In one variation, the flexible pipe 20 may include tensile layer 40, ringed layer 50, and tensile layer 80 with either one or both of the liner layer 30 and external jacket 90 not included. In another variation, one of the tensile layers 40 or 80 may not be included in the pipe 20. Alternatively, one of the tensile layers 40 or 80 may not have multiple layers and may simply include an extruded tube of plastic material. In other words, the flexible pipe 20 can at least include at least one first layer, a ringed layer 50 having interconnected rings (e.g., 60/70) disposed about the at least one first layer to provide strength to the pipe 20 against pressure loads, and at least one second layer disposed about the ringed layer 50, wherein at least one of the first or second layers provides tensile strength to the flexible pipe 20.

B. Flexible Pipe Having Interior Tubing, Abutting Rings and Clamps, and Exterior Tubing Another flexible pipe 300 according to certain teachings of the present disclosure illustrated in FIG. 8A has a pipe section 302 and a flanged end 304. The pipe section 302 will typically have another flanged end (not shown) on its distal end. As before, the flexible pipe 300 can be used to conduct production fluids offshore, although the flexible pipe 300 can be used for other purposes as will be appreciated with the benefit of the present disclosure. To conduct production fluids offshore, for example, the flexible pipe 300 can be used for jumpers, flow lines, risers, or other conduits used in offshore production, and the particular lengths and dimensions of the pipe 300 will depend on the desired implementation. As a flow line, for example, the length of the flexible pipe 300 from one flanged end 304 to the other may be about 1-km or the like, although any desired length could be used depending on the implementation.

1. Components and Construction of Flexible Pipe

Figure 9A:
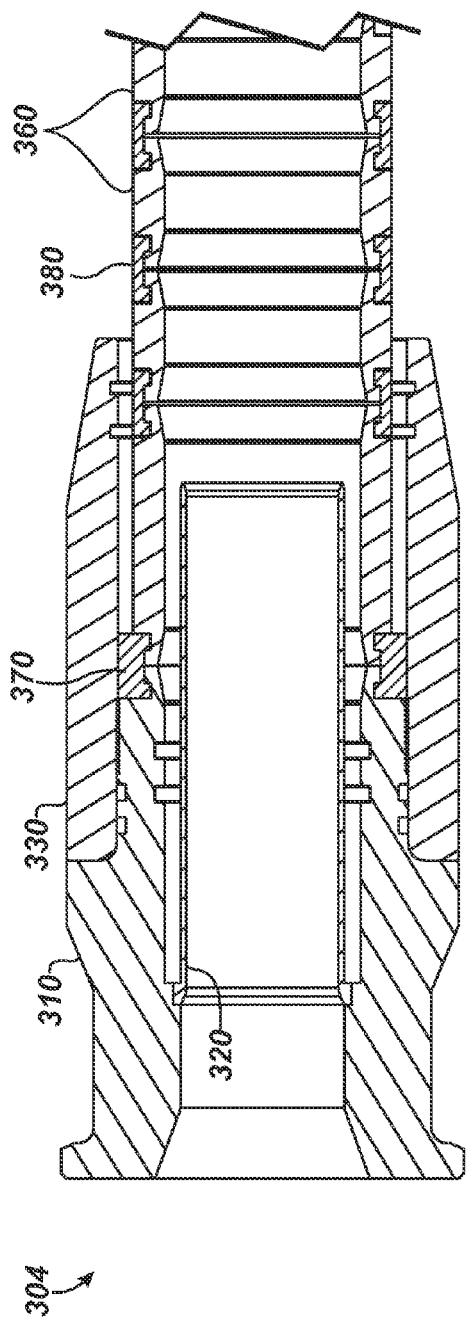
FIG. 9A is a cross-sectional view of the flexible pipe without certain components.
Figure 9C:
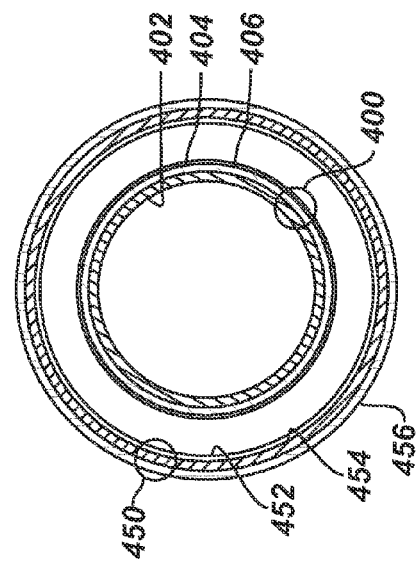
FIG. 9C is an end view of layers for the flexible pipe.
Figure 9B:
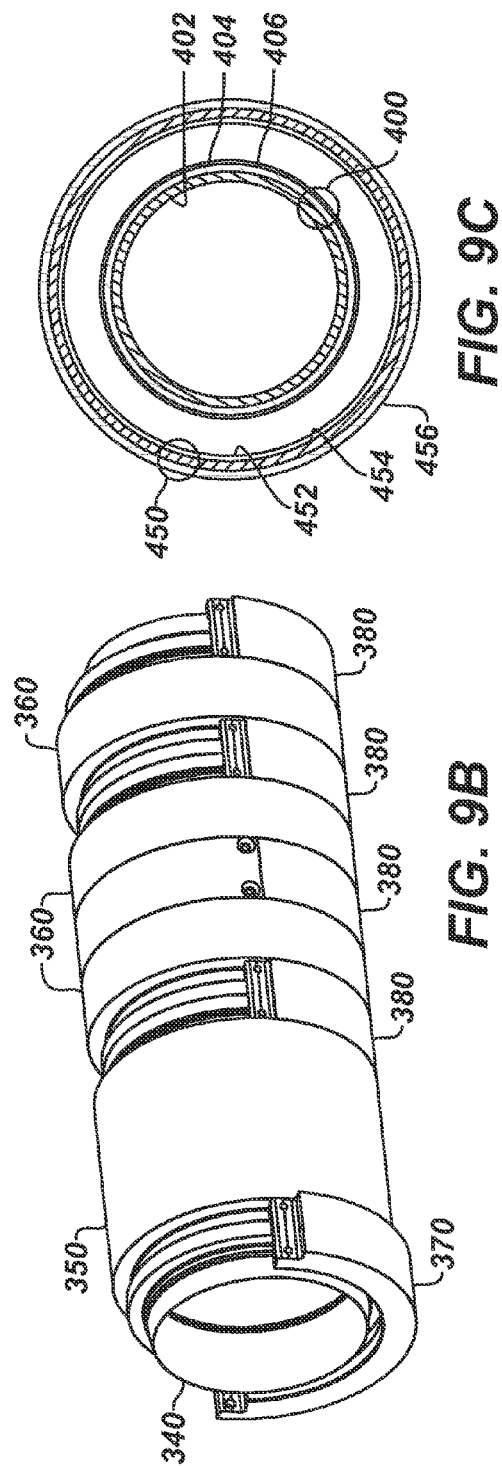
FIG. 9B is a perspective view of components of the flexible pipe.

The end of the flexible pipe 300 is shown in cross-section in FIG. 8B, and various components of the pipe 300 are best seen in FIG. 9A-9C, which omits certain components. As shown, the pipe section 302 has interior tubing 400, exterior tubing 450, and a series of rings 340/360 and clamps (380) disposed therebetween. The flanged end 304 has a flange 310, an inner tubular support 320, an outer tubular support 330, an end ring 350, and an end clamp 370.

Looking first at the pipe section 302, the interior tubing 400 defines an internal bore for conducting fluid and can have one or more layers. As shown in the end view of FIG. 9C, the interior tubing 400 has three inner layers 402, 404, and 406, although any number of layers could be used depending on the implementation. In one arrangement, the interior tubing 400 is a spoolable reinforced composite (SRC) pipe similar to that available from Future Pipe Industries. The first inner layer 402 is an extruded liner for conducting fluid and can have a suitable wall thickness for the implementation. This first layer 402 is composed of a composite thermoplastic, such as high-density polyethylene (HDPE), cross-linked polyethylene (PEX), or Polyamide (Nylon) 11 (PA-11), although the actual material used depends on the intended use of the pipe 300.

The second inner layer 404 can be an overwrapping layer of a composite laminate that provides a degree of stiffness and strength to the tubing 400. For example, this second layer 404 can be composed of E-glass fiber and/or carbon fibers disposed in an amine cured epoxy. The third layer 406 can be an optional lining for protecting the interior tubing 400 for transport and assembly and for providing a tolerance layer in the assembly.

As noted previously and as shown in FIG. 8B, the pipe section 302 also has a series of successively abutting rings (340/360) disposed about the interior tubing 400 and extending along the length of the flexible pipe 300. The rings include inner rings 340 and intermediate outer rings 360.

To assemble the pipe section 302, an intermediate ring 360 fits on the outside of the interior tubing 400, and an inner ring 340 fits on the interior tubing 400 and abuts the beveled opening in the intermediate ring 360. The inner ring 340 can define an axial slit (not shown) allowing the ring 340 to be flexed open slightly to help in positioning it on the tubing 400. This slit may also provide benefits in the flexing of the pipe section 302 as described in more detail later.

Continuing with the assembly of the pipe section, another intermediate ring 360 fits on the interior tubing 400 and abuts the inner ring 340 and the end of the adjacent intermediate ring 360. At this point, an intermediate clamp 380 affixes onto the abutting intermediate rings 360 to hold them together. The assembly of the rings 340, 360 and the clamps 380 then continues along the length of the interior tubing 400. When done, a series of inner rings 340 and intermediate rings 360 alternatingly fit and abut adjacent one another along the length of the interior tubing 400, and intermediate clamps 380 hold the abutting rings 360 together.

Although use of the inner rings 340 is preferred, alternative arrangements of the pipe section 302 may not use these inner rings 340. In such an instance, the intermediate rings 360 may be disposed on the interior tubing 400 alone and clamped together using the clamps 380. The rings 360 may still have their beveled ends as shown or may have more or less perpendicular edges suitably rounded to remove sharp edges. Moreover, if the rings 360 have beveled edges and are used by themselves, other devices such as bands, wrappings, or the like composed of thermoplastic, elastomer, or other suitable material can be disposed between the abutting rings 360 instead of the metal inner rings 340 as shown.

Because the pipe 300 will be used offshore and subject to pressure differentials and low temperatures, it may be preferred to pre-stress or compress the interior tubing 400 while assembling the rings 340/360 thereon. In essence, the interior tubing 400 may be slightly over diameter at normal temperatures. In this way, when subjected to low temperatures such as those experienced offshore, the interior tubing 400 can remain engaged with the inside of the rings 340/360 even though the tubing 400 has shrunk or compressed due to temperature. One suitable way to pre-stress or compress the interior tubing 400 during assembly involves flowing cold water, liquid nitrogen, or the like through the tubing 400 itself or a conduit or tube disposed in the tubing 400. The cold flow subjects the tubing 400 to low temperature while the rings 340/360 and clamps 380 are assembled on the outside of the tubing 400. Alternatively, the tubing 400 can be designed to not react significantly to the expected low temperature ranges that it may experience.

Eventually, an end of the interior tubing 400 is reached so the pipe section 302 can be prepared to receive components of the flanged end 304. Towards the end of interior tubing 400, an end ring 350 first fits onto the interior tubing 400 and abuts against the last intermediate ring 360 and inner ring 340. This end ring 350 can be essentially the same as the intermediate rings 360, but may have a greater length.

With the interior tubing, rings, and clamps of the pipe section 302 done, the exterior tubing 450 is then positioned along the length of the assembly to complete the pipe section 302. In general, the exterior tubing 450 can have one or more outer layers. As shown in the end view of FIG. 9C, for example, the exterior tubing 450 has three outer layers 452, 454, and 456, although any number of layers could be used depending on the implementation.

Like the interior tubing 400, this exterior tubing 450 can also be a spoolable reinforced composite (SRC) pipe similar to that available from Future Pipe Industries. The first outer layer 452 can be an extruded thermoplastic liner and can have a suitable wall thickness, while the second outer layer 454 can be an overwrapping of composite laminate. The third outer layer 456 is preferably an external jacket composed of a material with a thickness suitable for the environment (i.e., offshore) in which the pipe 300 will be exposed.

The exterior tubing 450 can be pre-constructed piping that is pulled along the length of the assembled rings 340/350/360 and clamps 380 using techniques known in the art. Alternatively, the separate layers of the exterior tubing 450 can be successively formed along the length of the assembly. For example, the first layer 452 of thermoplastic liner can be extruded or formed along the length of the assembly using techniques available in the art. Then, the second layer 454 can be formed as an overwrapping of composite material that is subsequently surrounded by the outer jacket of the third layer 456. Preferably, the series of rings 350/360 and clamps 380 are flush on their exterior surfaces to provide a continuous cylindrical outside surface for engaging inside the surrounding exterior tubing 450.

With the exterior tubing 450 completed, the flanged end 304 can be assembled on the end of the pipe section 302. Exposed ends of the interior and exterior tubing 400 and 450 are cut to proper lengths to accommodate the components of the flanged end 304. Initially, the interior tubular support 320 fits inside the bore of the interior tubing 400, and the outer tubular support 330 is disposed on the exterior tubing 450 for later assembly. Then, an inner ring 340 fits on the interior tubing's exposed end and abuts the inside of the end ring 350.

At this point, the flange 310 fits on the exposed end of the interior tubing 400 so that it abuts against the end ring 350 and last inner ring 340. To hold the flange 310, the end clamp 370 couples the flange 310 to the end ring 350. As shown in FIG. 8B, this end clamp 370 can be thicker than the intermediate clamps 380 used between the rings 350/360. Alternatively, this end clamp 370 may not be as thick as shown in FIG. 8B, although it may be wider. In this way, the abutting ends of the flange 310 and end ring 350 can be thicker and more reinforced than depicted in FIG. 8B.

When the flange 310 is installed, an inside groove of the flange 310 abuts against the end of the inner tubular support 320, and O-ring seals 307 inside grooves in the flange 310 seal against the outside of the interior tubing 400. As shown, the distal end of the inner support 320 extends beyond the distal end of the flange 310 and sandwiches the layers of the interior tubing 400 inside the flange 310 and portion of the end ring 350. For additional support, this inner tubular support 320 can extend a further distance inside the flange 310 towards its opening.

To complete the flanged end 304, the outer tubular support 330 previously positioned on the exterior tubing 450 then threads onto the outside of the flange 310. Once threaded, the exterior support 330 extends from the flange 310 and sandwiches layers of the exterior tubing 450 between the end ring 350 and portion of the last intermediate ring 360. To help with sealing, first O-ring seals 306 seal the engagement of the support 330 with the flange 310, and second O-ring seals 308 seal the engagement of the support 330 with the exterior tubing 450.

At this point, the construction of the flexible pipe 300 in FIGS. 8A-8B is practically complete, and the other end of the pipe section 302 can be constructed with another flanged end 304 in the same manner described previously. With an understanding of the components of the flexible pipe 300 described above, the discussion now turns to some particular details of the various components.

2. End Flange

Figure 10A:
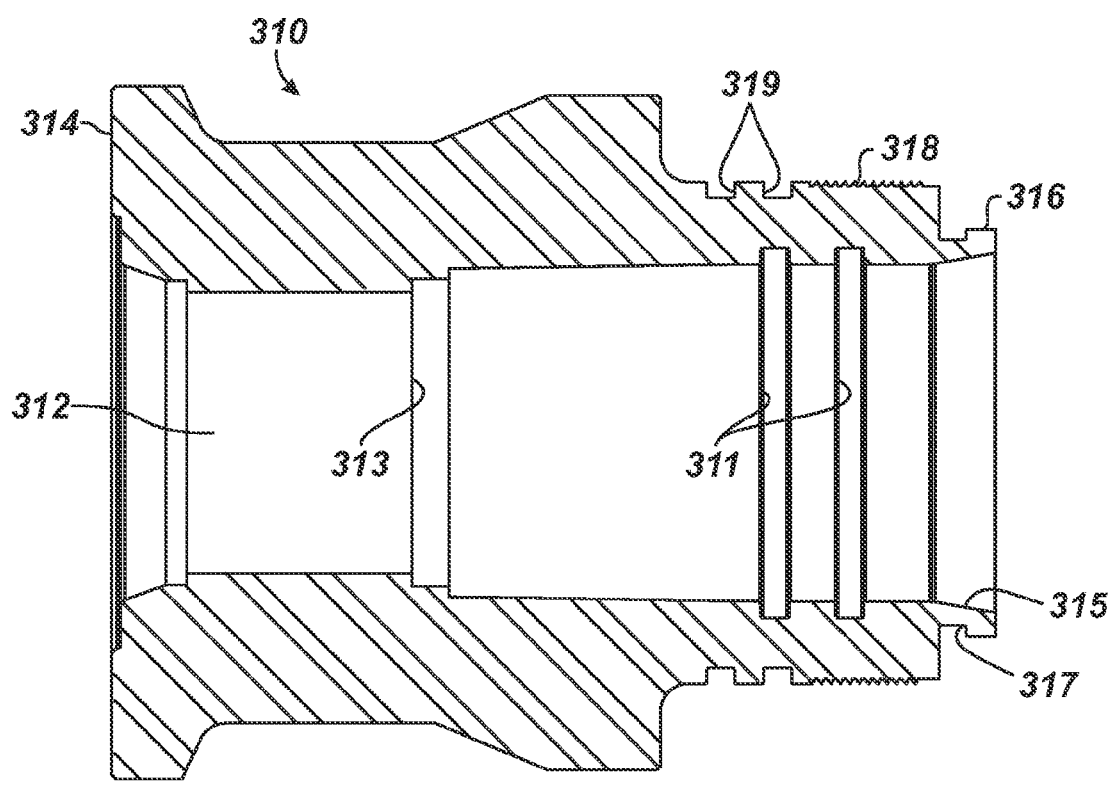
FIGS. 10A-10B illustrate a cross-section and a perspective view of an end flange for the flexible pipe.
Figure 10B:
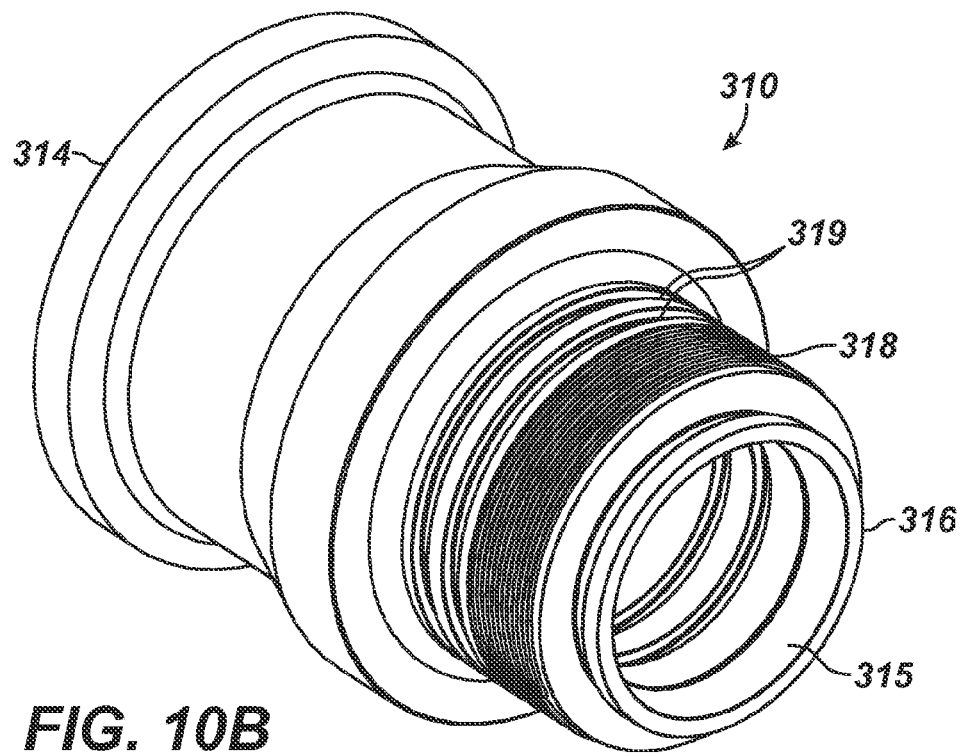

The flange 310 shown in more detail in FIGS. 10A-10B is preferably composed of metal, such as 4140 steel, or other suitable material. The flange 310 has an internal passage 312 for conducting fluid (such as offshore production fluid). One end of the flange 316 is configured with a circumferential channel 317 for coupling to an end ring (350) via an end clamp (370) as discussed previously. As depicted, the other end 314 of the flange 310 can be designed to couple using a Grayloc® remotely operated connector. (GRAYLOC is a registered trademark of Grayloc Products, LLC). Of course, the flange 310 can be configured to couple to a hub or other offshore production equipment using any available techniques known in the art.

Inside the bore 312, a ledge 313 supports an end of the inner support (320) that disposes in the bore 312. Also, slots 311 hold O-ring seals (not shown) for engaging the interior tubing (400) that disposes in the bore 312. Externally, the flange 310 has a threaded section 318 for coupling to the outer support (330), and slots 319 hold O-ring seals (not shown) for engaging the outer support (330) when disposed on the flange's second end 316.

3. Inner & Outer Supports

Figure 11:
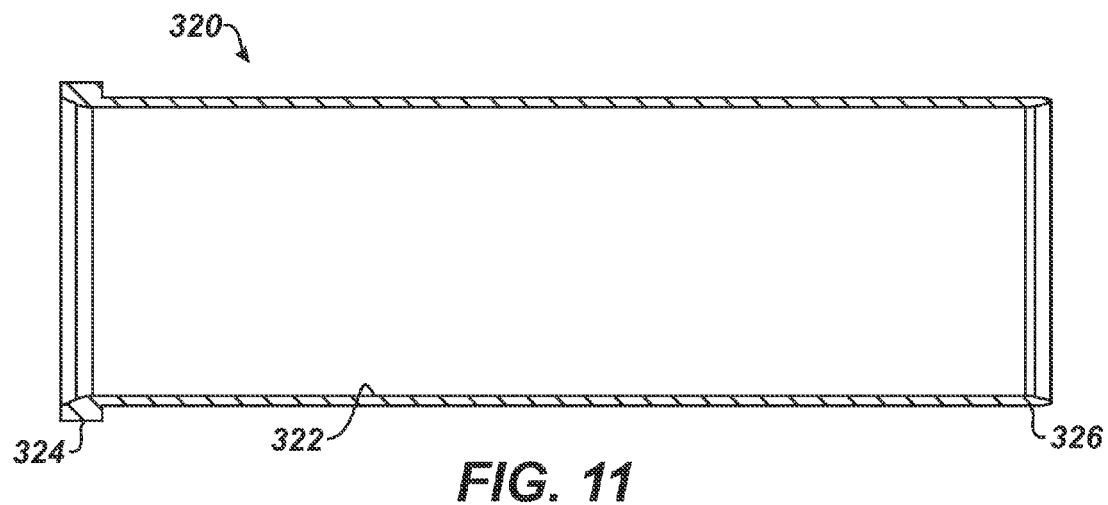
FIG. 11 illustrates a cross-section of an inner support for the flexible pipe.

The inner support 320 shown in more detail in FIG. 11 is preferably composed of metal, such as 4140 steel, or other suitable material. The support 320 has an elongated, tubular body with a bore 322 for conducting fluid. The support's first end 324 fits against the flange's ledge (313), whereas the second end 326 is intended to fit inside the bore of the interior tubing (400). Both of the bore's internal edges at these ends 324/326 are beveled to facilitate fluid flow through the support 330.

Figure 12:
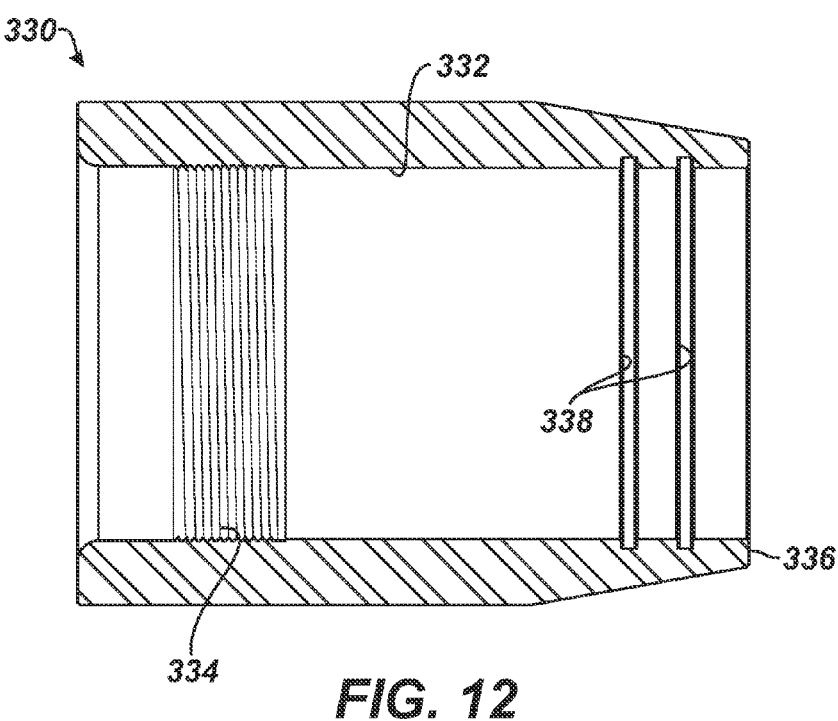
FIG. 12 illustrates a cross-section of an outer support for the flexible pipe.
Figure 17C:
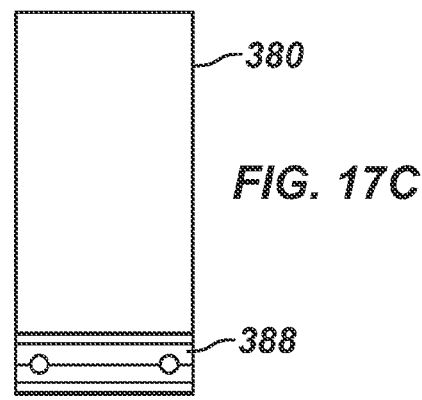
FIGS. 17A-17D illustrate side, front, top, and bottom views of an intermediate clamp for the flexible pipe.
Figure 17A:
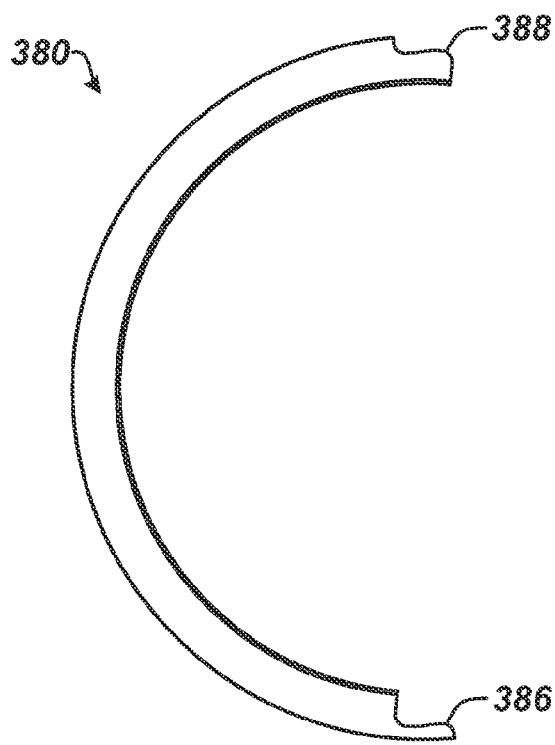
Figure 17B:
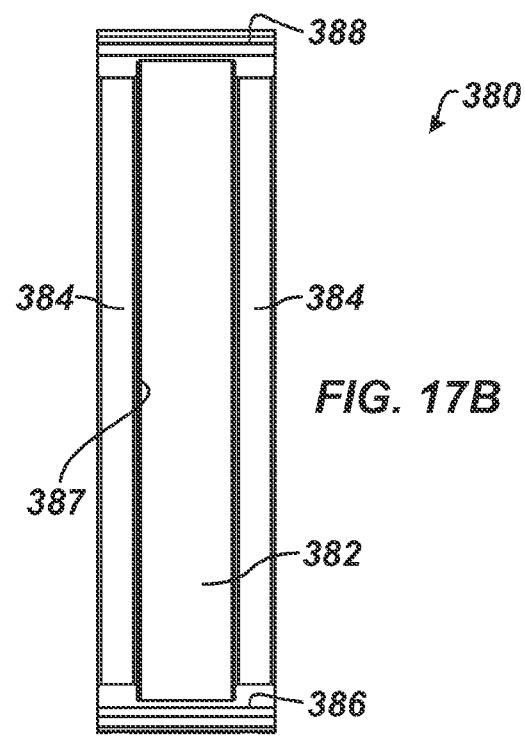
Figure 17D:
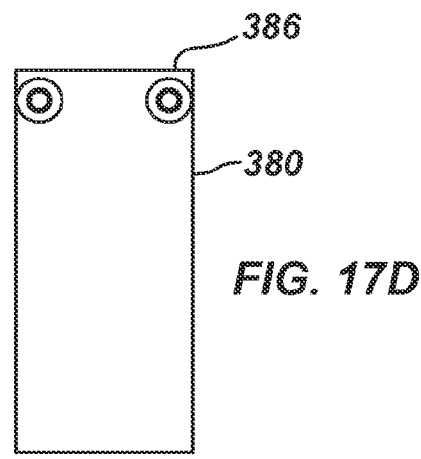

The outer support 330 shown in more detail in FIG. 12 is preferably composed of metal, such as 4140 steel, or other suitable material. The outer support 330 has a tubular body with a bore 332 for fitting on the end of the flange (310) and part of the exterior tubing (450). Inside, the bore 322 has threading 334 for mating to the flange (310), while the second end 336 has slots 338 to hold O-ring seals (not shown) to engage the exterior tubing (450).

4. Ring Configurations

As noted above, the flexible pipe 300 of FIGS. 8A-8B has three types of rings, including the inner rings 340, the end ring 350, and the intermediate ring 360. Each of the rings 340/350/360 can be composed of the same or different materials. In general, the rings 340/350/360 can be composed of metal, such as 4140 steel, or other suitable material.

The inner ring 340 shown in more detail in FIG. 13 has an internal bore 342 for fitting onto the pipe's interior tubing (400). Externally, this ring 340 has outer tapered surfaces 345a-b that taper in opposing directions from a center of the ring's outer surface to the opposing sides of the ring 340. Each of these tapered surfaces 345a-b also defines a slot 346 for holding an O-ring seal (not shown) to engage a surface of an abutting ring (350, 360) as discussed herein.

The end ring 350 shown in more detail in FIGS. 14A-14B also has an internal bore 352 for fitting onto the pipe's interior tubing (400). A first end 354 abuts the end flange (310) and has a channel 357 to clamp thereto with an end clamp (370). Similarly, the second end 356 abuts an intermediate ring (360) and has a similar channel 357 to clamp thereto with an intermediate clamp (380).

As shown in FIG. 14B, each channel 357 at the ends 354/356 may have an internal shoulder that is less than perpendicular to the central axis of the ring 350. In particular, the internal shoulder can define an angle $\theta_2$ of about 88-degrees or so (i.e., slanting inward about 2-degrees or so from perpendicular). As noted below, this angle $\theta_2$ mirrors what is used for the clamps (370, 380) used to couple in the channel 357. (For consistency, the flange 310 in FIG. 10A uses the same angle $\theta_2$ for the inside shoulder of its channel 317.)

As shown in FIG. 14A, the bore 352 has beveled edges 355a-b at the first and second ends 354/356 for abutting against inner rings (340) and sealing with the O-ring seals (not shown) disposed on the rings (340). As shown in FIG. 14B, these edges can define an angle $\theta_1$ of about 10-degrees or so, which can match the taper of the inner ring's outer surfaces (345a-b). (The beveled edge 315 in FIG. 10A for the flange 310 can also be similarly angled.)

The intermediate ring 360 is shown in more detail in FIG. 15 and is similarly configured to the end ring (350) with the exception of having a shorter axial length. Therefore, like reference numerals are used for similar elements in these two rings 350/360. Advantageously, the beveled edges 355a-b/365a-b facilitate fitting the rings (350/360) on the interior tubing (400) during assembly by making sliding the rings on the tubing easier.

In general, the internal bores 342/352/362 of these rings 340/350/360 can have a diameter to accommodate interior tubing (400). For example, the tubing (400) can have a diameter of about 4 to 12-in. and can have a wall thickness that depends on the implementation. For interior tubing (400) having an outside diameter of about 4.5-in., the end ring 350 can have an axial length of about 6-in., while the intermediate ring 360 can have an axial length of about 3-in. These dimensions are illustrative and can vary depending on the requirements of a given implementation and especially depend on the desired size of the pipe.

5. Flange, Ring, and Clamp Engagement

As noted above, an end clamp 370 shown in FIG. 9B is used to clamp the abutting end ring 350 to the flange 310, and intermediate clamps 380 in FIG. 9B are used to clamp the abutting rings 350/360 together. Each of the clamps 370/380 can be composed of the same or different materials. In general, the clamps 370/380 can be composed of metal, such as 4140 steel, or other suitable material. Moreover, the clamps 370/380 may be composed of the same or different material than that used for the rings 340/350/360. Having rings and clamps of various materials enables the pipe 300 to be particularly configured for tensile strength, pressure rating, amount of achievable flexure, and other factors for a particular implementation.

The end clamp 370 shown in detail in FIGS. 16A-16E has outer lips 374 and a center groove 372 defined inside its circumference. The lips 374 respectively fit into a channel (317) on the flange (310) and a channel (357) on the end ring (350) to coupled them together. The internal shoulders 378 of these lips 374 as shown in FIG. 16E can define an angle $\theta_3$ of about 88-degrees or so (i.e., slanted inwards about 2-degrees) to match the angle used on the channels discussed previously. Using these angled shoulders 376 on the lips 374 and the shoulders in the channels (317, 357) helps the end clamp 370 to interlock with the adjoining end ring 350 and flange 310.

As shown, the end clamp 370 defines a half circle. One end of the clamp 370 has an internal facing notch 376, while another end has an external facing notch 378. These notches 376/378 can have a tongue and groove arrangement that snap fits together in a clipping action when positioned on the rings. Two of the end clamp 370 shown in FIG. 16A couple together to clamp the flange (310) and end ring (350) together. This is best shown in FIG. 9B, which shows an isolated view of the rings (340, 350, 360) and clamps (370, 380). Accordingly, coupling two of the end clamps 370 together to clamp rings together involves fitting the clamps 370 on opposing sides of the abutting ring 350 and flange 310, matting the opposite facing notches 376/378 on the two clamps 370 together, and fastening the notches together with bolts or the like through fastener holes 371.

The intermediate clamp 380 shown in detail in FIGS. 17A-17D is similar to the end clamp (370) discussed previously with the exception of being thinner. Therefore, like reference numerals are used for similar elements in these two rings 350/360. In one implementation, the end clamp 370 defines an inner radius of about 5.5-in. when used for interior tubing (400) having an outside diameter of about 4.5-in. The intermediate clamp 380 similarly defines an inner radius of about 5.5-in.

An alternative form for coupling the clamps 370/380 together is shown in detail in FIGS. 18A-18C. Here, a clamp 375 (which can be an end or intermediate clamp) has holes 373 formed tangentially in an end for receiving fasteners (e.g., bolts) to couple in complementary holes on an end of another such clamp 375. Thus, fasteners couple these clamps 375 together in a tangential arrangement, while the fasteners for the previously described clamps 370/380 couple them together in a perpendicular arrangement.

Yet another clamp 385 shown in detail in FIGS. 19A-19B is configured to fit together using the notches on the ends without using fasteners and holes as in previous clamps. This clamp 385 may be suitable for the intermediate clamps used for the pipe 300. Having the interconnecting notched ends remain unfastened may allow these clamps 385 to shift or adjust relative to one another while affixing abutting rings together, and this degree of free-play may facilitate the bending or flexing of the pipe section 302 as discussed herein.

Although the various clamps 370/375/380/385 discussed above form a half circle so that two such clamps affix together to clamp abutting rings together, it will be appreciated that the clamps may define a smaller circumference so that more than two such clamps may be affix together to clamp the abutting rings together. For example, FIG. 20A shows three clamps 390 that fit together around abutting rings (not shown) to affix them together. These clamps 390 may have similarly notched ends and may or may not use fasteners.

If clamps used for the assembly are composed of a suitably flexible material and thickness, another alternative clamp can be composed of a unitary piece defining a full circle that can be opened and fit around the circumference of the rings so the clamp's ends can then be affixed together to clamp the rings together. For example, FIG. 20B shows a clamp 395 composed of a unitary circle with a slit. This clamp 395 can flex open and fit around abutting rings (not shown), and the clamp's ends can couple together to affix the abutting rings to one another. As before, the clamp 395 may have similarly notched ends and may or may not use fasteners. The above-described clamps and other possibilities will be evident to one skilled in the art having the benefit of the present disclosure.

6. Bending and Flexing of Flexible Pipe

As noted previously, the flexible pipe 300 is used to conduct production fluid offshore. Although the pipe 300 has rings 340/350/360 and clamps 370/380 composed of metal, the pipe 300 can be relatively buoyant due to the interior and exterior tubing 400/450. This is advantageous in offshore applications where long lengths of the pipe 300 can be used in seawater.

In the offshore environment, the pipe 300 must be able to be bent so it can be connected between offshore equipment. Moreover, deploying the pipe 300 offshore may require the pipe to be spooled on a reel carried by a deployment vessel. In addition, the pipe 300 must be able to flex so it can handle movement caused by offshore currents and the like.

Figure 21:
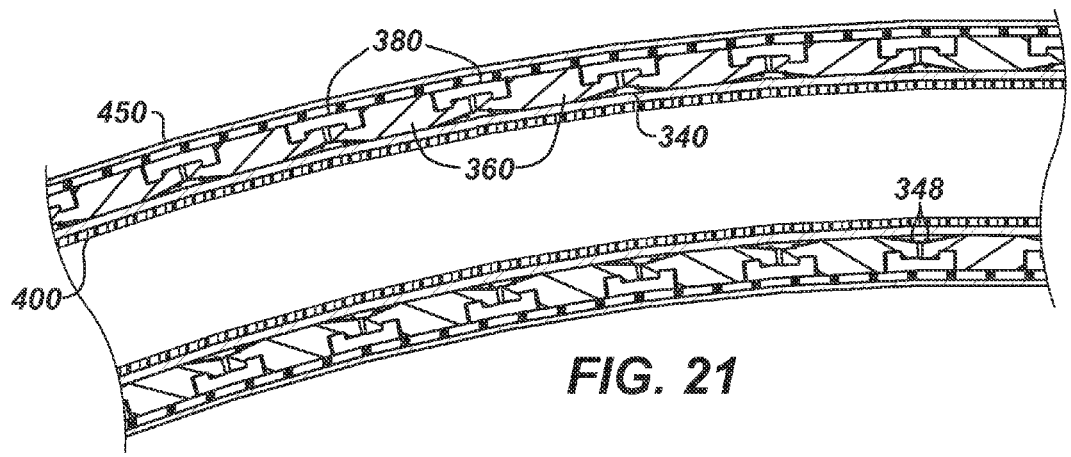
FIG. 21 shows a cross-section of the flexible pipe 300 during bending or flexing.

To illustrate the capabilities of the pipe 300, FIG. 21 shows an example section of the flexible pipe 300 in a bent or flexed state. In one arrangement, the rings 340/350/360 and clamps 370/350 with the associated interior and exterior tubing 400/450 discussed above enable the pipe 300 to bend or flex at about ½-degree for every length of intermediate ring 350, although other degrees of bending and flexing can be configured for a particular implementation. Because the layers for the tubing 400/450 are composed of materials such as plastic, fiberglass, composites, etc., they can readily flex with the bending of the pipe 300.

During the bending or flexing, the seals 348 on the outside of the inner rings 340 remain sealably engaged with the beveled ends of the abutting rings 360. The clamps 380 hold the abutting rings 360 together with the inwardly angled shoulders on the inside of the clamps 380 and the ring's channels helping to interlock the clamps 380 with the rings 360 even while slightly pivoted relative to one another.

Figure 22A:
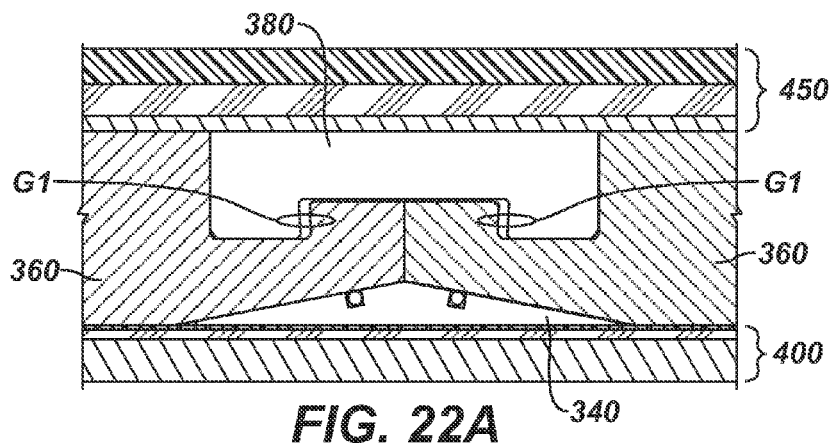
FIGS. 22A-22B show details of the flexible pipe 300 in an initial state and in a bent or flexed state.
Figure 22B:
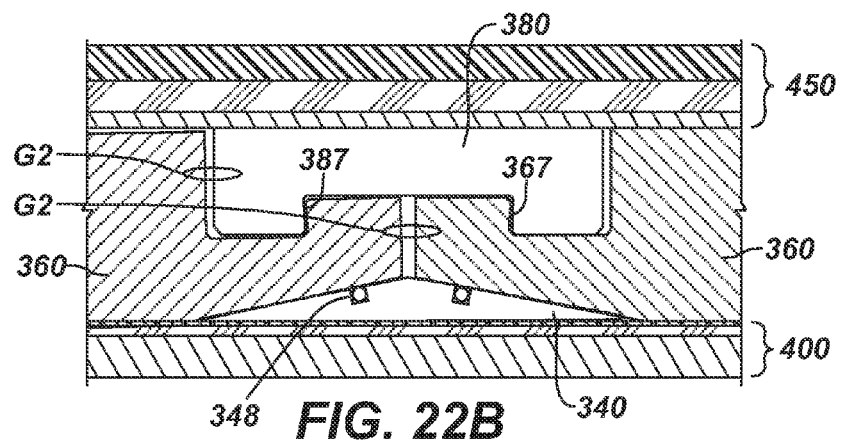

Slight gaps purposefully configured by the dimensions of the components allow the abutting rings 360 held by the clamps 380 to pivot relative to one another. In particular, as shown in the detail of FIG. 22A, gaps G1 are provided between the shoulders at the clamp 380 and the channels of the abutting rings 360. In a bent state such as shown in FIG. 22B, these gaps G1 allow for movement of one ring 360 relative to the other by producing other gaps G2, while the clamp's shoulders 387 interlock with the channel's shoulders 367. In addition, the split in the inner ring 340 may allow these rings 340 to accommodate movement of the adjacent rings 350. All the while, the seals 348 on the inner ring 340 maintain sealed engagement with the beveled ends of the adjoining rings 360.

The foregoing description of preferred and other embodiments is not intended to limit or restrict the scope or applicability of the inventive concepts conceived of by the Applicants. The present disclosure has described the flexible pipes for use offshore to conduct offshore production fluids. It will be appreciated with the benefit of the present disclosure, however, that the flexible pipes disclosed herein can be used in other applications. For example, features of the pipe's layers such as the materials used, the arrangement of the layers, their thicknesses, their internal diameters, and the like can be configured for a particular implementation. In addition, the pipe's flexibility, reduced maintenance, lighter weight, and the like make the pipe suitable for land-based applications and gas transportation as well as offshore applications.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A flexible pipe, comprising:
   interior tubing having one or more first layers and defining a bore for conducting fluid, the one or more first layers comprising an inner liner having the bore for conducing fluid and comprising at least one outer layer disposed about the inner liner, the at least one outer layer comprising an overwrapping layer of a composite laminate;
   a plurality of first rings disposed about the interior tubing, each of the first rings abutting one another;
   a plurality of clamps coupling the abutting first rings together; and
   exterior tubing having one or more second layers and disposed about the first rings and the clamps.

2. A flexible pipe, comprising:
   interior tubing having one or more first layers and defining a bore for conducting fluid;
   a plurality of first rings disposed about the interior tubing, each of the first rings abutting one another;
   a plurality of clamps coupling the abutting first rings together; and
   exterior tubing having one or more second layers and disposed about the first rings and the clamps, the one or more second layers comprising an inner layer disposed on the rings and the clamps and comprising an overwrapping layer of a composite laminate disposed about the inner layer.

3. A flexible pipe, comprising:
   interior tubing having one or more first layers and defining a bore for conducting fluid;
   a plurality of first rings disposed about the interior tubing, each of the first rings abutting one another;
   a plurality of clamps coupling the abutting first rings together;
   exterior tubing having one or more second layers and disposed about the first rings and the clamps; and
   a flange assembly coupled to an end of the pipe, the flange assembly comprising a flange having a distal end abutting one of the first rings on the end of the pipe, and a second clamp coupling the one first ring to the distal end of the flange.

4. A flexible pipe, comprising:
   interior tubing having one or more first layers and defining a bore for conducting fluid;
   a plurality of first rings disposed about the interior tubing, each of the first rings abutting one another;
   a plurality of clamps coupling the abutting first rings together, each of the clamps comprising at least two clamp portions fitting around the abutting first rings and coupling together; and
   exterior tubing having one or more second layers and disposed about the first rings and the clamps.

5. The pipe of claim 4, wherein each of the at least two clamp portions has ends fastenable to ends of the other of the at least two clamp portions.

6. The pipe of claim 4, wherein each of the at least two clamp portions has a first end with an interior facing notch and a second end with an exterior facing notch, the first ends being mateable with the second ends.

7. A flexible pipe assembly method, comprising:
   disposing a plurality of first rings, second rings, and seals about interior tubing, the second rings disposed between the first rings, the seals disposed between the first and second rings;
   abutting the first rings end-to-end on the interior tubing;
   abutting each of the second rings to a portion of a bore in the ends of the first rings;
   clamping the first rings together end-to-end by affixing a plurality of clamps to the abutting ends of the first rings; and
   disposing exterior tubing about the first rings and the clamps.

8. A flexible pipe assembly method, comprising:
   disposing a plurality of first rings about interior tubing;
   abutting the first rings end-to-end on the interior tubing;
   clamping the first rings together end-to-end by:
      fitting at least two clamp portions in adjacent channels on the abutting ends of the first rings, and
      affixing notched ends of the at least two clamp portions together; and
   disposing exterior tubing about the first rings and the clamps.

9. A flexible pipe assembly method, comprising:
   disposing a plurality of rings about interior tubing;
   abutting the rings end-to-end on the interior tubing;
   clamping the rings together end-to-end by affixing a plurality of clamps to the abutting ends of the rings;
   disposing exterior tubing about the rings and the clamps;
   disposing a flange on an end of the interior tubing;
   abutting an end of the flange against the ring at the end of the pipe; and
   clamping the flange and the ring together end-to-end by affixing a clamp to the abutting ends of the flange and the ring.

10. The pipe of claim 1, wherein each of the first rings is a discrete ring component separate from the other first rings; and wherein each of the clamps is a discrete clamp component separate from the other clamps.

11. The pipe of claim 1, wherein the flexible pipe comprises a jumper, a flow line, a riser, or conduit used in offshore production.

12. The pipe of claim 1, wherein the one or more second layers of the exterior tubing comprises:
    an inner layer disposed on the plurality of rings and clamps; and
    an overwrapping layer of a composite laminate disposed about the inner layer.

13. The pipe of claim 1, further comprising a flange assembly coupled to an end of the pipe.

14. The pipe of claim 13, wherein the flange assembly comprises a flange having a distal end abutting one of the first rings on the end of the pipe, and a second clamp coupling the one first ring to the distal end of the flange.

15. The pipe of claim 13, wherein the flange assembly comprises:
    an inner tubular support disposed inside the bore of the interior tubing and having one end engaging inside a bore of the flange; or
    an outer tubular support disposed outside the exterior tubing and having one end coupled to the flange.

16. The pipe of claim 1, wherein each of the clamps comprises at least two clamp portions fitting around the abutting first rings and coupling together.

17. The pipe of claim 16, wherein each of the at least two clamp portions comprises:
   ends fastenable to ends of the other of the at least two clamp portions; or
   a first end with an interior-facing notch and a second end with an exterior-facing notch, the first ends being mateable with the second ends.

18. The pipe of claim 1, wherein:
   the first rings each define an opening fittable onto the interior tubing, each end of the opening defining an inner tapered surface; and
   the pipe further comprises a plurality of second rings disposing on the interior tubing between the first rings, each of the second rings having outer tapered surfaces abuttable to one of the inner tapered surfaces of the first rings.

19. The pipe of claim 1, wherein the plurality of first rings and clamps permit pivoting between interconnected ones of the rings.

20. The method of claim 7, wherein each of the first rings is a discrete ring component separate from the other first rings; and wherein each of the clamps is a discrete clamp component separate from the other clamps.

21. The method of claim 7, wherein disposing the exterior tubing about the first rings and the clamps comprises:
   pulling the exterior tubing over the first rings and clamps; or
   forming the exterior tubing over the first rings and clamps.

22. The method of claim 7, wherein affixing the plurality of clamps to the abutting ends of the first rings comprises:
   fitting at least two clamp portions in adjacent channels on the ends of the first rings; and
   affixing notched ends of the at least two clamp portions together.

23. The method of claim 7, further comprising fitting a flange assembly on an end of the flexible pipe.

24. The method of claim 23, wherein fitting the flange assembly comprises:
   disposing a flange on an end of the interior tubing;
   abutting an end of the flange against the first ring at the end of the pipe; and
   clamping the flange and the first ring together end-to-end by affixing a clamp to the abutting ends of the flange and the first ring.

25. The method of claim 24, wherein fitting the flange assembly comprises:
   disposing a first support in a first bore of the flange and a second bore of the interior tubing; and
   engaging the flange to an end of the exterior tubing by disposing a second support outside the flange and the exterior tubing.

26. The method of claim 9, wherein fitting the flange assembly comprises:
   disposing a first support in a first bore of the flange and a second bore of the interior tubing; and
   engaging the flange to an end of the exterior tubing by disposing a second support outside the flange and the exterior tubing.

27. The pipe of claim 2, wherein each of the first rings is a discrete ring component separate from the other first rings; and wherein each of the clamps is a discrete clamp component separate from the other clamps.

28. The pipe of claim 2, wherein the flexible pipe comprises a jumper, a flow line, a riser, or conduit used in offshore production.

29. The pipe of claim 2, further comprising a flange assembly coupled to an end of the pipe.

30. The pipe of claim 29, wherein the flange assembly comprises a flange having a distal end abutting one of the first rings on the end of the pipe, and a second clamp coupling the one first ring to the distal end of the flange.

31. The pipe of claim 29,
   wherein the flange assembly comprises an inner tubular support disposed inside the bore of the interior tubing and having one end engaging inside a bore of the flange; or
   wherein the flange assembly comprises an outer tubular support disposed outside the exterior tubing and having one end coupled to the flange.

32. The pipe of claim 2, wherein each of the clamps comprises at least two clamp portions fitting around the abutting first rings and coupling together.

33. The pipe of claim 32, wherein each of the at least two clamp portions comprises:
   ends fastenable to ends of the other of the at least two clamp portions; or
   a first end with an interior-facing notch and a second end with an exterior-facing notch, the first ends being mateable with the second ends.

34. The pipe of claim 2, wherein:
   the first rings each define an opening fittable onto the interior tubing, each end of the opening defining an inner tapered surface; and
   the pipe further comprises a plurality of second rings disposing on the interior tubing between the first rings, each of the second rings having outer tapered surfaces abuttable to one of the inner tapered surfaces of the first rings.

35. The pipe of claim 2, wherein the plurality of first rings and clamps permit pivoting between interconnected ones of the rings.

36. The pipe of claim 3, wherein each of the first rings is a discrete ring component separate from the other first rings; and wherein each of the clamps is a discrete clamp component separate from the other clamps.

37. The pipe of claim 3, wherein the flexible pipe comprises a jumper, a flow line, a riser, or conduit used in offshore production.

38. The pipe of claim 3, wherein the flange assembly comprises:
   an inner tubular support disposed inside the bore of the interior tubing and having one end engaging inside a bore of the flange; or
   an outer tubular support disposed outside the exterior tubing and having one end coupled to the flange.

39. The pipe of claim 3, wherein each of the clamps comprises at least two clamp portions fitting around the abutting first rings and coupling together.

40. The pipe of claim 39, wherein each of the at least two clamp portions comprises:
   ends fastenable to ends of the other of the at least two clamp portions; or
   a first end with an interior-facing notch and a second end with an exterior-facing notch, the first ends being mateable with the second ends.

41. The pipe of claim 3, wherein:
   the first rings each define an opening fittable onto the interior tubing, each end of the opening defining an inner tapered surface; and
   the pipe further comprises a plurality of second rings disposing on the interior tubing between the first rings, each of the second rings having outer tapered surfaces abuttable to one of the inner tapered surfaces of the first rings.

42. The pipe of claim 3, wherein the plurality of first rings and clamps permit pivoting between interconnected ones of the rings.

43. The pipe of claim 4, wherein each of the first rings is a discrete ring component separate from the other first rings; and wherein each of the clamps is a discrete clamp component separate from the other clamps.

44. The pipe of claim 4, wherein the flexible pipe comprises a jumper, a flow line, a riser, or conduit used in offshore production.

45. The pipe of claim 4, further comprising a flange assembly coupled to an end of the pipe.

46. The pipe of claim 45, wherein the flange assembly comprises:
- an inner tubular support disposed inside the bore of the interior tubing and having one end engaging inside a bore of the flange; or
- an outer tubular support disposed outside the exterior tubing and having one end coupled to the flange.

47. The pipe of claim 4, wherein:
- the first rings each define an opening fittable onto the interior tubing, each end of the opening defining an inner tapered surface; and
- the pipe further comprises a plurality of second rings disposing on the interior tubing between the first rings, each of the second rings having outer tapered surfaces abuttable to one of the inner tapered surfaces of the first rings.

48. The pipe of claim 4, wherein the plurality of first rings and clamps permit pivoting between interconnected ones of the rings.

49. The method of claim 8, wherein each of the first rings is a discrete ring component separate from the other first rings; and wherein each of the clamps is a discrete clamp component separate from the other clamps.

50. The method of claim 8, wherein disposing the exterior tubing about the first rings and the clamps comprises:
- pulling the exterior tubing over the first rings and clamps; or
- forming the exterior tubing over the first rings and clamps.

51. The method of claim 8, further comprising:
- disposing a plurality of second rings about the interior tubing between the first rings; and
- abutting each of the second rings to a portion of a bore in the ends of the first rings when abutting the first rings end-to-end.

52. The method of claim 8, further comprising fitting a flange assembly on an end of the flexible pipe.

53. The method of claim 9, wherein each of the first rings is a discrete ring component separate from the other first rings; and wherein each of the clamps is a discrete clamp component separate from the other clamps.

54. The method of claim 9, wherein disposing the exterior tubing about the first rings and the clamps comprises:
- pulling the exterior tubing over the first rings and clamps; or
- forming the exterior tubing over the first rings and clamps.

55. The method of claim 9, further comprising:
- disposing a plurality of second rings about the interior tubing between the first rings; and
- abutting each of the second rings to a portion of a bore in the ends of the first rings when abutting the first rings end-to-end.

* * * * *